US008482579B2

(12) United States Patent
Ishihara

(10) Patent No.: US 8,482,579 B2
(45) Date of Patent: Jul. 9, 2013

(54) IMAGE DISPLAY DEVICE AND IMAGE DISPLAY METHOD

(75) Inventor: Tomoyuki Ishihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 797 days.

(21) Appl. No.: 12/452,511

(22) PCT Filed: Jun. 13, 2008

(86) PCT No.: PCT/JP2008/060897
§ 371 (c)(1),
(2), (4) Date: Jan. 6, 2010

(87) PCT Pub. No.: WO2009/034757
PCT Pub. Date: Mar. 19, 2009

(65) Prior Publication Data
US 2010/0118044 A1 May 13, 2010

(30) Foreign Application Priority Data
Sep. 14, 2007 (JP) ................................. 2007-240136

(51) Int. Cl.
*G09G 5/02* (2006.01)
(52) U.S. Cl.
USPC ...... 345/611; 345/589; 348/607; 375/240.16; 375/E7.104; 375/E7.105
(58) Field of Classification Search
USPC .............. 345/589, 611; 348/607; 375/240.16, 375/E7.104, E7.105
See application file for complete search history.

(56) References Cited

U.S. PATENT DOCUMENTS

| 7,933,333 B2* | 4/2011 | Huang et al. ............. 375/240.16 |
| 2001/0019586 A1* | 9/2001 | Kang et al. ............... 375/240.16 |

(Continued)

FOREIGN PATENT DOCUMENTS

| JP | 3295437 | 4/2002 |
| JP | 2002-351382 | 12/2002 |

(Continued)

OTHER PUBLICATIONS

T. Ishihara et al, "New Display Driving Method for . . . ", SID 2009 Display Week May 31, 2009.

(Continued)

*Primary Examiner* — Xiao M. Wu
*Assistant Examiner* — Todd Buttram
(74) *Attorney, Agent, or Firm* — Harness, Dickey & Pierce, P.L.C.

(57) ABSTRACT

In one embodiment of the present invention, an image display device capable of providing adequate quality of a moving image regardless of an image signal level of an input image signal is disclosed. An image display device of the present invention displays an image in accordance with image signals of respective pixels in each frame period wherein a frame period corresponds to image signals for a single screen, and the image display device comprises: a timing controller for dividing a single frame period into a plurality of periods including at least one sub frame A period and at least one sub frame B period; an image signal preconverting section for converting image signal levels of input image signals for the respective pixels so that the converted image signal levels are within a range from a predetermined lower limit to a predetermined upper limit; a first image processing section for carrying out a smoothing process with respect to the converted image signals of the respective pixels in the sub frame A period; a second image processing section for carrying out an emphasizing process with respect to the converted image signals of the respective pixels in the sub frame B period; and an image display section for displaying an image in accordance with the image signals for the respective pixels.

19 Claims, 24 Drawing Sheets

U.S. PATENT DOCUMENTS

| | | | |
|---|---|---|---|
| 2004/0201564 A1 | 10/2004 | Sugino et al. | |
| 2004/0208395 A1* | 10/2004 | Nomura | 382/275 |
| 2004/0233157 A1 | 11/2004 | Sekiya et al. | |
| 2004/0263495 A1 | 12/2004 | Sugino et al. | |
| 2005/0156843 A1 | 7/2005 | Itoh et al. | |
| 2005/0162360 A1* | 7/2005 | Ishihara et al. | 345/89 |
| 2006/0119617 A1 | 6/2006 | Toyooka et al. | |
| 2006/0227249 A1* | 10/2006 | Chen et al. | 348/631 |
| 2007/0195199 A1* | 8/2007 | Chen et al. | 348/607 |
| 2007/0262974 A1 | 11/2007 | Take | |
| 2007/0263121 A1 | 11/2007 | Take et al. | |
| 2007/0291138 A1* | 12/2007 | Cheung et al. | 348/240.2 |
| 2008/0180424 A1 | 7/2008 | Ishihara | |
| 2009/0040374 A1 | 2/2009 | Kobayashi | |
| 2009/0060365 A1 | 3/2009 | Nagata et al. | |
| 2009/0207186 A1 | 8/2009 | Toyooka et al. | |

FOREIGN PATENT DOCUMENTS

| | | |
|---|---|---|
| JP | 2007-304204 | 11/2007 |
| JP | 2007-304205 | 11/2007 |
| JP | 2009-053221 | 3/2009 |
| WO | WO 03/101086 | 12/2003 |

OTHER PUBLICATIONS

English Version of ISR.

* cited by examiner

IMAGE DISPLAY DEVICE AND IMAGE DISPLAY METHOD

TECHNICAL FIELD

The present invention relates to an image display device such as a liquid crystal display device or the like and to an image display method.

BACKGROUND ART

An image display device using a hold type display device, e.g., a liquid crystal display device, has such a problem that quality of a moving image deteriorates (edge blurs).

The deterioration of quality (blurred edge) of a moving image which occurs in a conventional hold type display device will be explained by taking, as an example, a case where a region whose image signal luminance level is 75% moves horizontally on a background whose image signal luminance level is 25% as illustrated in FIG. 2.

FIG. 16 illustrates a distribution of input image signal luminance levels respectively corresponding to the pixels in a single horizontal line of a single screen corresponding to image signals inputted to a certain frame at the time of the aforementioned image display.

FIG. 17 illustrates temporal transition of the display luminance distribution in the conventional hold type display device. This temporal transition is observed when such an image moves horizontally. Generally, an observer viewing an image watches a horizontally moving object, so that the observer recognizes, as a luminance level which can be felt by eyes, an integration quantity obtained by integrating display luminance levels in directions indicated by arrows. In FIG. 18, for easier illustration of input image signal luminance levels, a luminance response time of the display device is ignored, and numeric values respectively indicate states of luminance levels of the pixels in the single horizontal line of the single frame in case where the single frame period is divided into eight periods.

Distribution felt by the observer's eyes is an integration quantity of the luminance levels. In case where a velocity at which an object (region whose luminance level is 75%) moves is 8 pixels/frame, the integration quantity of the luminance levels is an average level of a sum of the luminance levels in the time periods added up in the arrow directions. FIG. 19 is a graph indicative of the distribution of the luminance levels. This luminance level distribution is such that there are lines each indicative of a region whose luminance level is 25% and there is a line indicative of a region whose luminance level is 75% and these lines are connected by line segments each of which is inclined in the vicinity of a border between the regions. A horizontal width of this inclined line segment is recognized as the blurred edge. This causes the deterioration of quality of a moving image in the hold type display device.

The most simple method for reducing the blurred edge is such that a minimum luminance level (black) display period is provided in a part of a display single frame. However, according to such a method, bright and dark states are repeated in the entire screen at each cycle of a single frame, which results in occurrence of flickers. Further, also in case where an input image signal is maximum, a minimum luminance level display period is necessarily provided in a single frame period, which results in drop of the luminance level.

The following describes a case where a width of the region whose luminance level is 75% is smaller than a movement amount on the background whose luminance level is 25% in a single frame period as illustrated in FIG. 8.

FIG. 20 illustrates a distribution of input image signal luminance levels corresponding to pixels on a single horizontal line of a single screen corresponding to image signals inputted to a certain frame at the time of the image display illustrated in FIG. 8. FIG. 21 illustrates temporal transition of a display luminance distribution in a conventional hold type display device. This temporal transition is observed when such an image moves horizontally. FIG. 22 is a table showing numeric values respectively indicating states of luminance levels of the pixels in a single horizontal line of a single frame period in case where the single frame period is divided into eight periods.

In case where a velocity at which an object (region whose luminance level is 75%) moves is 8 pixels/frame, an integration quantity of the luminance levels is an average of the luminance levels in the time periods added up in the arrow directions, and is the distribution felt by the observer's eyes is the integration quantity. FIG. 23 is a graph indicative of the distribution of the luminance levels.

As illustrated in FIG. 23, the large blurred edge as exemplified in FIG. 19 does not occur, but a luminance level of an object which essentially moves with a luminance level of 75% significantly drops to 44%. This means that a moving object appears to be darker than it is. Also this point causes the deterioration of quality of a moving image.

Contrary to the aforementioned example, the background has a high luminance level and a moving region has a low luminance level, so that the luminance of the moving region appears to be higher. This phenomenon causes the deterioration of quality of a moving image.

Patent Literature 1 proposes a method for reducing the blurred edge without generating any flickers. This method is such that: as illustrated in FIG. 24, a virtual frame image corresponding to a temporal midpoint between two consecutive frames is estimated and generated, and the thus generated virtual frame image is inserted between the two consecutive frames so as to reduce the blurred edge, thereby preventing the deterioration of quality of a moving image.

However, in the method such as Patent Literature 1, it is difficult to exactly estimate an image signal between the two frames, and estimation failure may cause an error.

The following focuses on a single horizontal line of a screen in case where an object whose luminance level is 75% moves horizontally on the background whose luminance level 25% as illustrated in FIG. 2. For example, a luminance level distribution of input image signals in an (N−1)th frame is as illustrated in FIG. 25(a), and a luminance level distribution of input image signals in an N th frame is as illustrated in FIG. 25(b). At this time, in case where it is possible to exactly estimate and generate a virtual frame corresponding to a temporal midpoint between the (N−1)th frame and the N th frame, the luminance level distribution is such that the region whose luminance level is 75% is positioned at a midpoint between the (N−1)th frame and the N th frame as illustrated in FIG. 25(c). However, it is difficult to completely exactly estimate an image signal between the two frames, and estimation failure may cause an error. If the virtual frame corresponding to the temporal midpoint contains an error, this results in a state illustrated in FIG. 25(d). As illustrated by an arrow, a pixel at a position where a luminance level should be 75% has a luminance level of 25%.

In case where an error occurs in the virtual frame corresponding to the temporal midpoint, numeric values respectively indicating states of luminance levels in a single frame period are as illustrated in FIG. 26, and a distribution of luminance level integration quantities viewed by an observer watching a moving object is as illustrated in FIG. 27. This example shows that: in the vicinity of a right edge of the region whose luminance level is 75%, estimation failure does not occur concerning the virtual frame, so that there is no problem in the distribution of the luminance level integration quantities, and a width of the blurred edge is improved due to the original effect compared with the case of the conventional hold type display device illustrated in FIG. 19. However, due to an influence exerted by occurrence of the estimation failure concerning the virtual frame, there are level differences in a distribution waveform of the luminance level integration quantities. The level differences cause the deterioration of quality, e.g., an image noise, and the like.

On the other hand, Patent Literature 2 discloses a technique in which an image free from a high spatial frequency and an image emphasizing the high spatial frequency are repeatedly displayed so as to prevent a moving image from blurring. However, according to the technique of Patent Literature 2, frame images are generated from a single input image, so that there occurs deviation in a relationship between time space and luminance centroid with respect to an observer who watches an object moving on a screen, which raises such a problem that it is impossible to appropriately keep a distribution of integrated luminances which are observed at a front end and at a rear end of a displayed object. Further, positive values of a high spatial frequency component are removed, which results in such a problem that a luminance of an emphasized frame is always high and flickers occur in the entire screen.

A technique disclosed by the following Patent Literature 3 can solve the problems in Patent Literature 1 and Patent Literature 2.

Patent Literature 3, which regards an invention also invented by the present inventors, is such that: a single frame period is divided into a sub frame period A and a sub frame period B, and a blurring process is carried out in the sub frame period A, and an emphasizing process is carried out in the sub frame period B, so as to improve quality of a moving image, thereby solving the problem in Patent Literature 1.

Further, Patent Literature 3 discloses a technique in which: a blurred frame image is generated, and an average value between the latest frame and a previous frame is used. Thus, according to Patent Literature 3, it is possible to realize an appropriate relationship between space time and luminance centroid with respect to the observer who watches an object moving on the screen, so that it is possible to keep an appropriate distribution of integrated luminances observed at a front edge and at a rear edge of a displayed object. Further, according to Patent Literature 3, a broad luminance of the blurred frame and a broad luminance of the emphasizing frame are identical to each other, so that no flickers occur in the entire screen.

However, the technique disclosed by Patent Literature 3 has the following problem.

That is, in carrying out the emphasizing process, in case where a level of an input image signal which is originally inputted from the outside and which has not been subjected to the emphasizing process is approximate to a minimum image signal level which can be displayed or approximate to a maximum image signal level which can be displayed, further emphasis cannot be carried out, so that it may be impossible to sufficiently carry out the emphasizing process. The insufficient emphasizing process makes it impossible to improve quality of a moving image. This is a problem in this technique.

Citation List

Patent Literature 1
Japanese Patent No. 3295437 (issued on Jun. 24, 2002)
Patent Literature 2
US2006/0227249 (Publication Date: Oct. 12, 2006)
Patent Literature 3
WO2007/052441 (Publication Date: May 10, 2007: International publication)
Patent Literature 4
Japanese Patent Application Publication, Tokukai, No. 2002-351382 A (Publication Date: Dec. 6, 2002)

SUMMARY OF INVENTION

Technical Problem

An object of the present invention is to provide an image display device and an image display method each of which is capable of providing adequate quality of a moving image regardless of an image signal level of an input image signal.

An image display device according to an embodiment of the present invention displays an image in accordance with image signals of respective pixels in each frame period wherein a frame period corresponds to image signals for a single screen, said image display device comprising: a dividing section for dividing a single frame period into a plurality of periods including at least one sub frame A period and at least one sub frame B period; a converting section for converting image signal levels of input image signals for the respective pixels so that the converted image signal levels are within a range from a predetermined lower limit to a predetermined upper limit; a first image processing section for carrying out a smoothing process with respect to the converted image signals of the respective pixels in the sub frame A period; a second image processing section for carrying out an emphasizing process with respect to the converted image signals of the respective pixels in the sub frame B period; and an image display section for displaying an image in accordance with (i) the image signals which have been subjected to the smoothing process by the first image processing section and which correspond to the respective pixels and (ii) the image signals which have been subjected to the emphasizing process by the second image processing section and which correspond to the respective pixels.

In the aforementioned image display device, a single frame period is divided into a plurality of periods including at least one sub frame A period and at least one sub frame B period, and there are provided: a first image processing section for carrying out a smoothing process with respect to image signals of the respective pixels in the sub frame A period; and a second image processing section for carrying out an emphasizing process with respect to image signals of the respective pixels in the sub frame B period. In this manner, by carrying out the smoothing process in the one sub frame period, a difference between an image signal level of the target pixel and an image signal level of a peripheral pixel becomes small, and by carrying out the emphasizing process in the other sub frame period, the difference between the image signal level of the target pixel and the image signal level of the peripheral pixel becomes great, but a luminance in a broad range in each sub frame hardly drops or hardly rises, so that it is possible to improve quality of a moving image of a hold type display device without dropping a luminance and without bringing bout any flickers.

However, in case where a level of an input image signal to be inputted is approximate to a maximum image signal level or a minimum image signal level, an image signal level cannot be made higher than the maximum image signal level and the image signal level cannot be made lower than the minimum image signal level even in trying to carry out the emphasizing process, so that the emphasizing process cannot be carried out, which results in such a problem that it is impossible to improve quality of a moving image.

In order to solve the problem, the present invention comprises a converting section for converting image signal levels of input image signals for the respective pixels so that the converted image signal levels are within a range from a predetermined lower limit to a predetermined upper limit. Thus, image signal levels of the input image signals can be converted so that the converted image signal levels are within a predetermined certain range. Therefore, the emphasizing process can be carried out regardless of the image signal levels of the inputted image signals, so that it is possible to carry out an appropriate emphasizing process. Thus, it is possible to improve quality of a moving image (it is possible to obtain a high-quality moving image) regardless of the image signal level of the inputted image signal.

Thus, according to the aforementioned image display device, quality of a moving image can be improved (high-quality moving image can be obtained) regardless of the image signal level of the image signal to be inputted.

BRIEF DESCRIPTION OF DRAWINGS

FIG. 6 is a diagram in which numeric values respectively indicate states of luminance levels of pixels within a single frame period.

Figure 18:
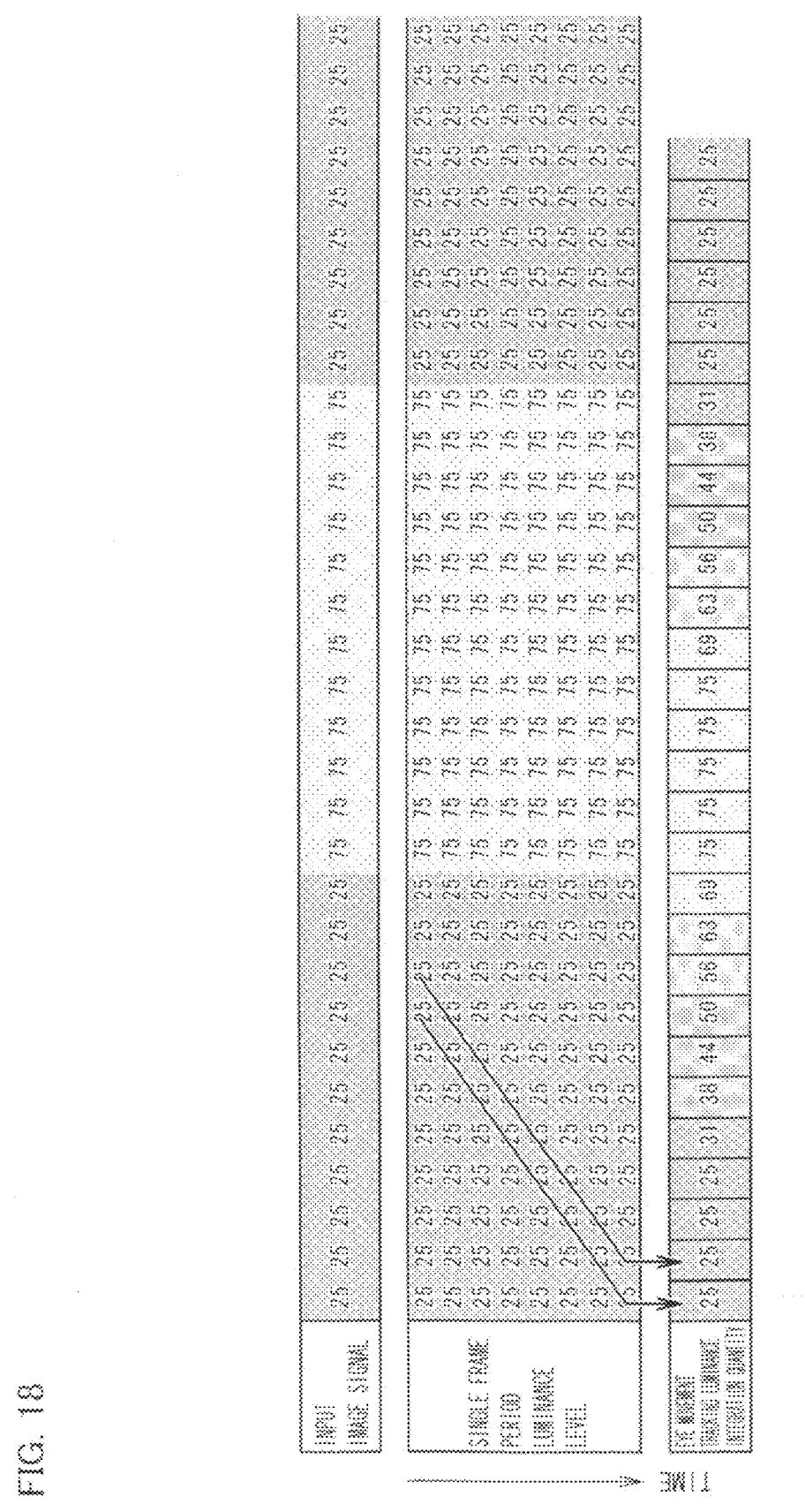

FIG. 18 is a diagram in which numeric values respectively indicate states of luminance levels of pixels within a single frame period.

REFERENCE SIGNS LIST

2 Image signal preconverting section (converting section)
3 Motion degree calculating section (detecting section)
12 display section
40 Timing controller (dividing section)
46 Sub frame A image signal generating section (first image processing section)
47 Sub frame B image signal generating section (second image processing section)
63 Time average image signal level generating section (virtual sub frame generating section)

BEST MODE FOR CARRYING OUT THE INVENTION

One embodiment of the present invention is described below with reference to the attached drawings.

In the present embodiment, in case of displaying an N th frame, image signals of an (N−1)th frame and the N th frame, i.e., image signals of two consecutive frames, are used to generate a virtual sub frame Q in which an image signal level of each pixel corresponds to an image signal level obtained by averaging image signals levels for respective pixels of both the frames.

Further, a single frame period is time-divided into two sub frames both of which are equal to each other in terms of a time period. In a sub frame A period obtained by the time division, an image signal obtained by averaging (weighted averaging or simple averaging) image signals of pixels in a peripheral certain range (reference range) including a target pixel of the virtual sub frame Q is outputted as a sub frame A image signal.

While, in the other sub frame B period, there is outputted an image signal obtained by carrying out an emphasizing process with respect to an average (weighted average or simple average) of input image signals of the N th frame which are inputted to the pixels positioned in the reference range including the target pixel, and an image signal for emphasizing a difference between a high level and a low level of an input image signal for the target pixel is outputted as a sub frame B image signal. In short, in the present embodiment, the averaging process (smoothing process) is carried out in the sub frame A period, and the emphasizing process is carried out in the sub frame B period.

[Configuration of Image Display Device]

Figure 1:
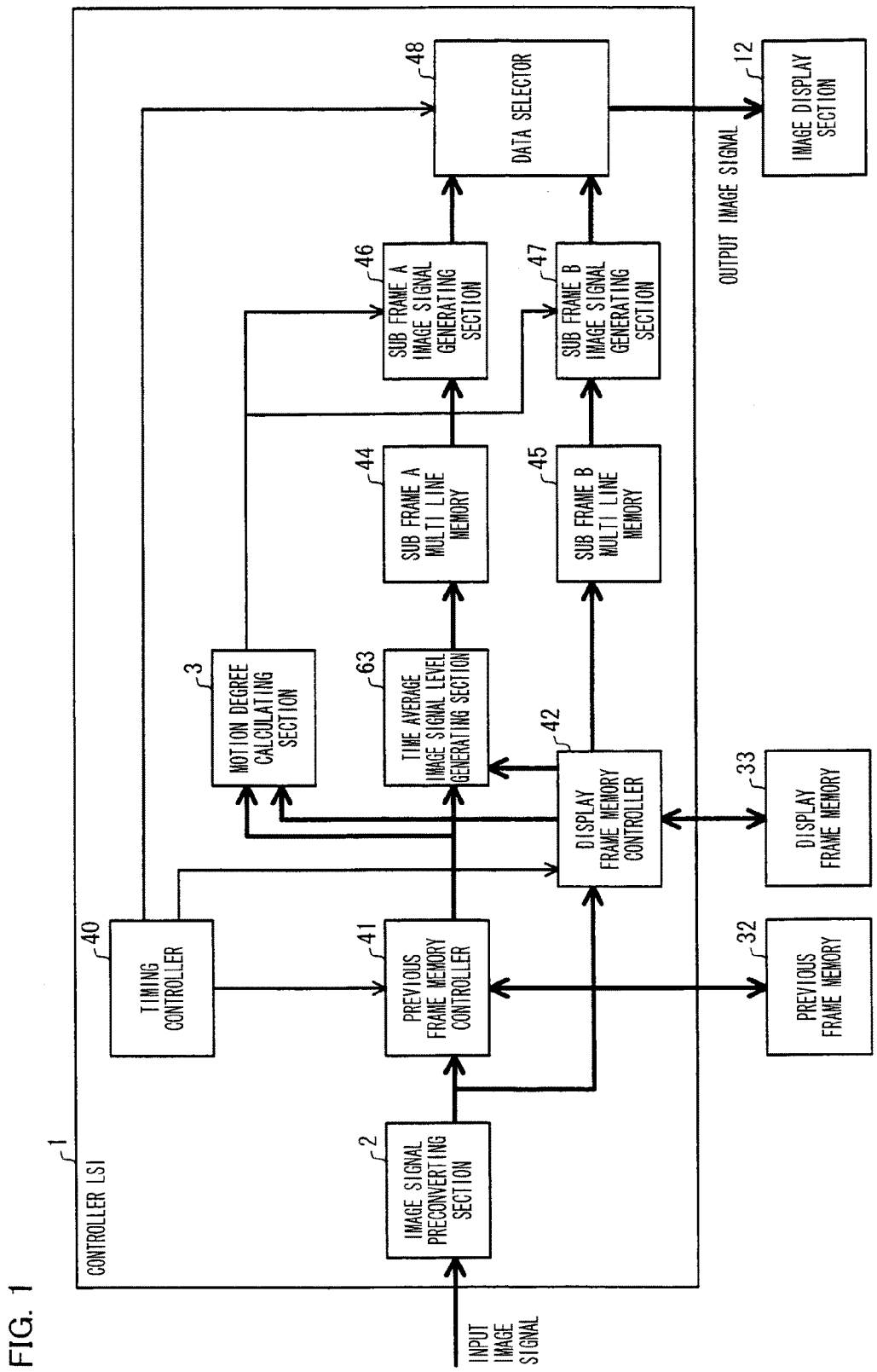
FIG. 1 is a block diagram illustrating an example of a configuration of an image display device.

FIG. 1 is a diagram schematically illustrating an image display device of the present embodiment.

As illustrated in FIG. 1, the image display device is configured so that a controller LSI1 is connected to an image display section 12 of a liquid crystal panel or the like, a previous frame memory 32, and a display frame memory 33.

The controller LSI1 includes: an image signal preconverting section (converting section) 2; a timing controller (dividing section) 40; a previous frame memory controller 41; a display frame memory controller 42; a time average image signal level generating section (virtual sub frame generating section) 63; a motion degree calculating section (detecting section) 3; a sub frame A multi line memory 44; a sub frame B multi line memory 45; a sub frame A image signal generating section (first image processing section) 46; a sub frame B image signal generating section (second image processing section) 47; and a data selector 48.

The converting section 2 is a characteristic feature of the present embodiment. In order to more greatly improve quality of a moving image, the converting section 2 carries out a predetermined converting process with respect to an input image signal inputted from the outside and outputs the thus processed input image signal. More specifically, the converting section 2 carries out the conversion so that an input image signal is within a range between a predetermined upper limit and a predetermined lower limit. This conversion can be carried out in accordance with user's preference or design intention of a product developer. A specific manner in which the converting process is carried out and an effect of improving quality of a moving image will be described later.

The timing controller 40 generates timings of a sub frame A period and sub frame B period which are obtained by time-dividing an input frame period of 60 Hz. Further, the timing controller 40 controls the previous frame memory controller 41, a display frame memory controller 42, and a data selector 48.

(1) The previous frame memory controller 41 writes an input image signal of 60 Hz into the previous frame memory 32.

(2) The previous frame memory controller 41 reads a frame image signal, which has been written on the previous frame memory 32 and which corresponds to a frame previous to a frame read by the display frame memory controller 42, in accordance with a timing of the sub frame memory A period, and such reading operations are sequentially carried out, and the previous frame memory controller 41 forwards the previous frame image signal to the time average image signal level generating section 63 and the detecting section 3. The frame memory controller 41 concurrently carries out the foregoing operations (1) and (2) in a time-division manner.

(3) The display frame memory controller 42 writes an input image signal of 60 Hz into a display frame memory 33.

(4) The display frame memory controller 42 reads a frame image signal, which is written on the display frame memory 33 and which corresponds to a frame subsequent to a frame having been read by the previous frame memory controller 41, at timings of the sub frame A period and the sub frame B period, by reading an image signal for a single frame at two cycles, and the display frame memory controller 42 forwards the subsequent frame image signal to the time average image signal level generating section 63, the sub frame B multi line memory 45, and the detecting section 3. The display frame memory controller 42 concurrently carries out the foregoing operations (3) and (4) in a time-division manner.

The time average image signal level generating section 63 causes a calculating circuit or software to calculate an average value between a previous frame image signal level for a target pixel and a display frame (current frame) image signal level for the target pixel, and generates a virtual sub frame Q in which this average value corresponds to an image signal level.

The detecting section 3 uses a numeric value to indicate a motion degree (degree of motion) of a video by comparing the previous frame image signal with the current frame image signal, and restricts a difference between the below-described sub frame A image signal or the sub frame B image signal and a preconverted image signal for the target pixel in accordance with the numeric value (calculation result).

Specifically, there is a method in which the motion degree is regarded as the number of pixels each of which is such that an image signal difference between the previous frame and the current frame in view of the same position is not less than a predetermined value in a range (reference range) defined by a horizontal X pixel and a vertical Y line with the target pixel centered in the range. As other method, there is a method: in which differences each of which is a difference between an image signal level in the previous frame and an image signal level in the current frame are accumulated while more greatly weighting an image signal level of a reference pixel positioned closer to the target pixel in horizontal and vertical directions, and the thus obtained value is regarded as the motion degree. Also, there is a method in which: a pixel movement amount (motion vector amount) is estimated, and the thus estimated amount is regarded as the motion degree.

An example of a method for estimating the pixel movement amount is as follows. Image signals of a certain region in a current frame which region centers a target pixel centered therein and image signals of plural certain regions in a previous frame are successively compared. In the previous frame, if a central pixel of the certain region is such that a total of level differences from the image signals of the certain region of the current frame is small, this central pixel is regarded as having moved to the target pixel of the current frame, and an amount of this movement is regarded as a movement amount of the target pixel. After estimating movement amounts of the respective pixels, the movement amount of the target pixel (i.e., an absolute value of the motion vector) is regarded as the motion degree without any modification, or a total of movement amounts of peripheral pixels centering the target pixel is regarded as the motion degree of the pixel, or a value obtained by accumulating the image signal levels is regarded as the motion degree of the pixel while more greatly weighting an image signal level of a reference pixel positioned closer to the target pixel. According to the method, not only the movement amount of the pixel but also movement amounts of peripheral pixels are accumulated, so that it is possible to appropriately process a signal even if an abnormal vector is detected to some extent, but this method results in higher cost of the control section.

Each of the sub frame A/B multi line memories 44 and 45 retains image signals, corresponding to the Y line, in and around the horizontal line being scanned for carrying out display.

In case where the value calculated by the detecting section 3 satisfies a certain condition (below-described condition (a)), the first image processing section 46 inputs, via the sub frame A multi line memory 44, image signals corresponding to the range in the virtual sub frame Q which range is defined by the horizontal X pixel and the vertical Y line with the target pixel centered in the range. Thereafter, the first image processing section 46 accumulates image signal levels of respective pixels in the region, defined by the horizontal X pixel and the vertical Y line (i.e., the reference range) while weighting the image signal levels, and a total of the accumulated values is divided by a total of weighting factors for the respective pixels in the reference range, and the thus obtained value is regarded as a sub frame A image signal. Note that, the weighting may be carried out by equally weighting image signal levels of the respective pixels in the reference range (by using the weighting factor equal to each other) or may be carried out by more greatly weighting an image signal of a pixel positioned closer to the target pixel.

In case where the value calculated by the detecting section 3 satisfies a certain condition (below-described condition (a)), the second image processing section 47 inputs, via the sub frame B multi line memory, image signals of the respective pixels in the reference range with the target pixel centered. Thereafter, with respect to the reference range, the second image processing section 47 carries out calculation in the same manner as in generation of the sub frame A image signal.

Next, the second image processing section 47 generates the sub frame B image signal for the target pixel so that a time integration quantity of a display luminance level in a single virtual frame period, which display luminance level is constituted of (i) an image signal obtained as a result of the calculation and (ii) the sub frame B image signal, is identical to a luminance level observed in case where an image based on a preconverted image signal for the target pixel becomes still. The sub frame B image signal becomes an image signal subjected to an emphasizing process. That is, the sub frame B image signal is determined so that a time integration quantity of a luminance level of each pixel in a single frame period is identical to a luminance level observed in case where an image based on a preconverted image signal for the target pixel becomes still.

Specifically, there is a method in which calculation is carried out in accordance with a response speed performance of an image display panel (image display section 12), and also there is method in which: a luminance indicated by each image signal is measured, and there is provided a conversion table for outputting a sub frame B image signal suitable for each combination of the input image signal and the image signal obtained as a result of the foregoing calculation.

A data selector 48 selects the sub frame A image signal or the sub frame B image signal in accordance with a current display sub frame phase so as to forward the selected signal to the image display section 12.

Next, the following will describe Experimental Examples using the present embodiment.

EXPERIMENTAL EXAMPLE 1

Figure 2:
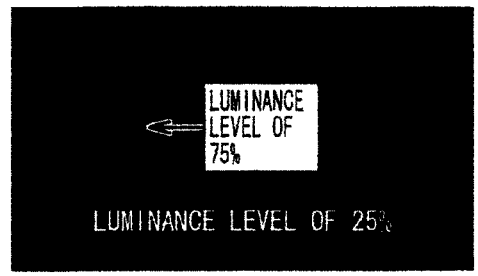
FIG. 2 illustrates a state in which a region whose image signal luminance level is 75% moves horizontally on a background whose image signal luminance level is 25%.
Figure 3:
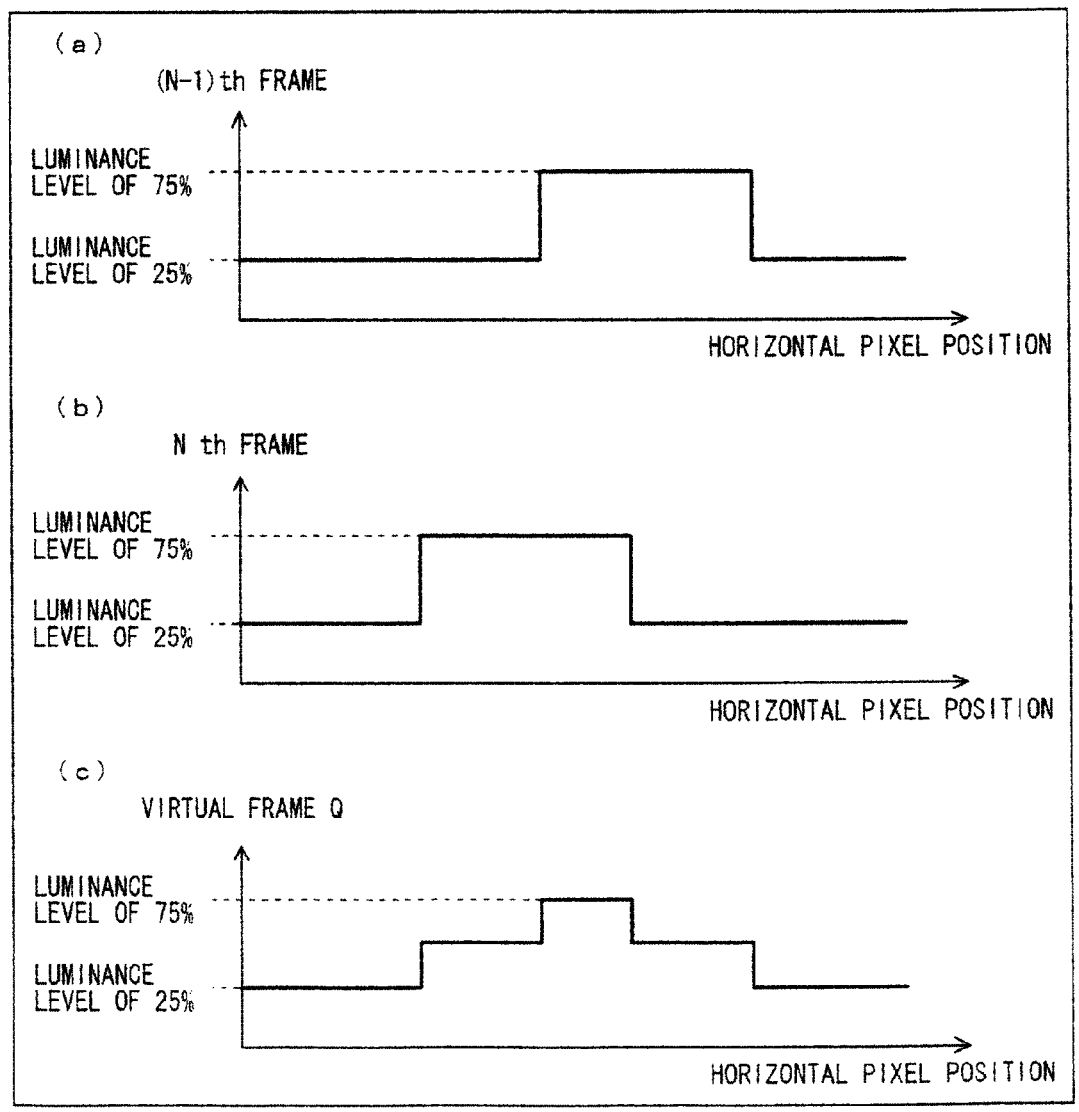
FIG. 3 illustrates luminance levels in a single horizontal line of a screen. (a) illustrates luminance levels at respective horizontal pixel positions in an (N−1)th frame. (b) illustrates luminance levels at respective horizontal pixel positions in an N th frame. (c) illustrates luminance levels at respective horizontal pixel positions in a virtual sub frame Q.

Note a single horizontal line of a screen in case where an object whose width is larger than a movement amount in a single frame period and whose luminance level is 75% moves horizontally on a background whose luminance level is 25% as illustrated in FIG. 2. For example, a luminance level distribution of input image signals of an (N−1)th frame is as illustrated in (a) of FIG. 3, and a luminance level distribution of input image signals of an N th frame is as illustrated in (b) of FIG. 3. At this time, a luminance level distribution in a single horizontal line of the virtual sub frame Q using, as an image signal level, an intermediate value of input image signal levels for each pixel after conversion of the N th frame and the (N−1)th frame is as illustrated in (c) of FIG. 3.

In generating the sub frame A image signal and the sub frame B image signal, the respective pixels of the reference range are equally weighted, and the image signal levels are accumulated with the weighting factors equal to each other, and a total of the accumulated values is divided by a total of the weighting factors for the respective pixels in the range.

Figure 4:
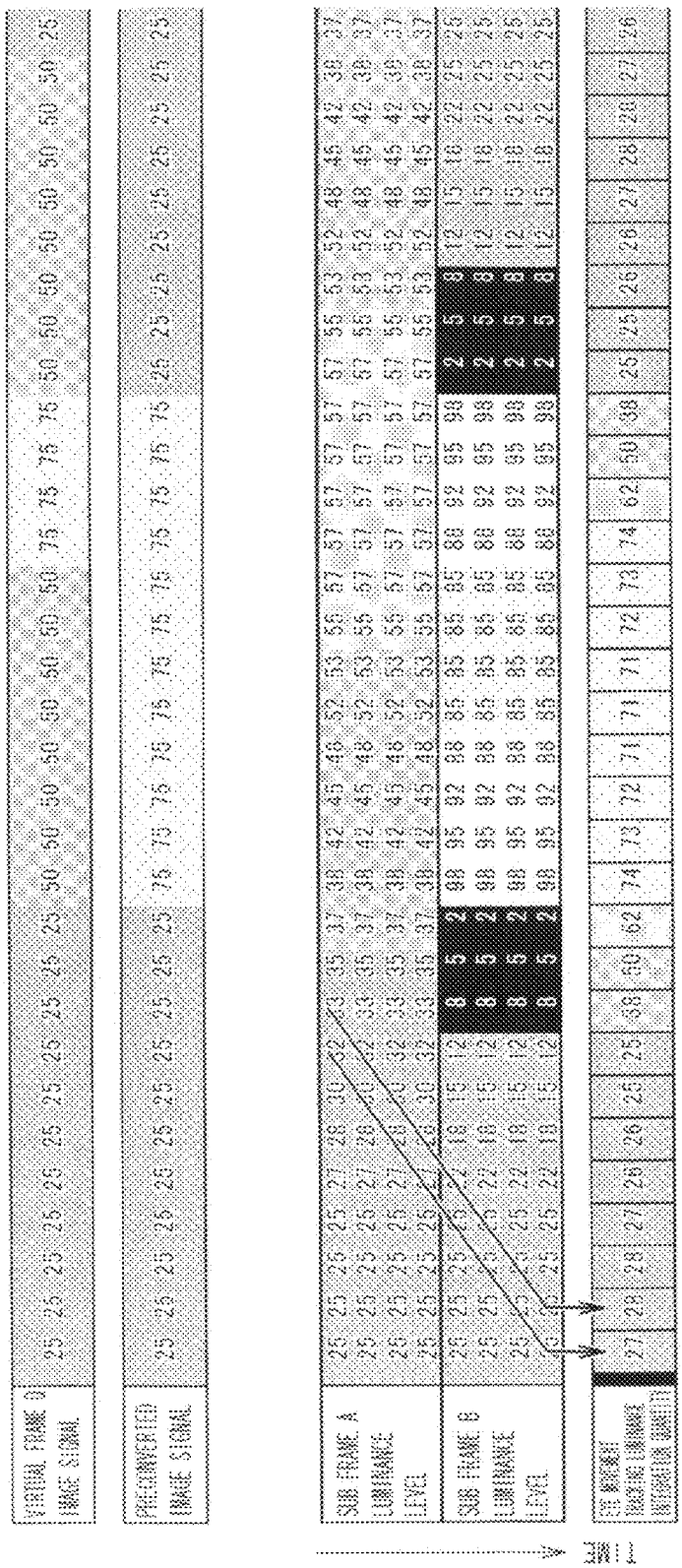
FIG. 4 is a diagram in which numeric values respectively indicate states of luminance levels of pixels within a single frame period.
Figure 5:
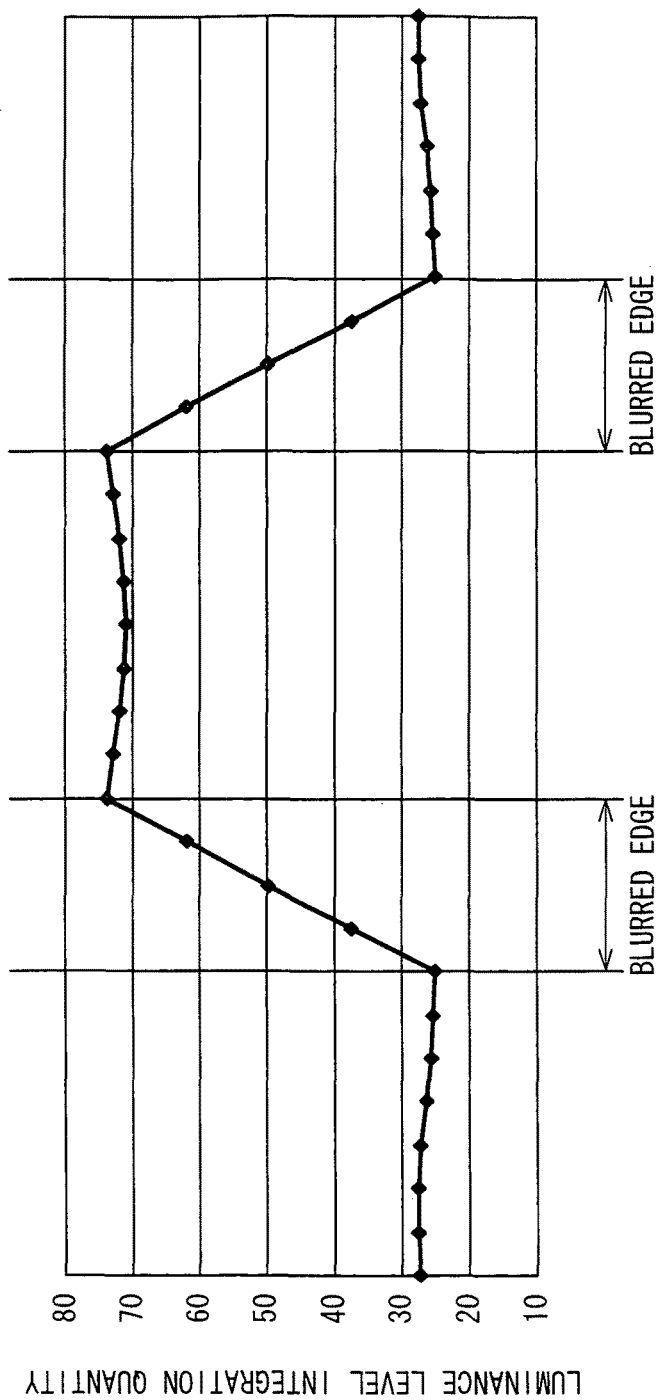
FIG. 5 is a diagram illustrating a distribution of luminance levels which can be viewed by an observer watching a moving object.
Figure 6:
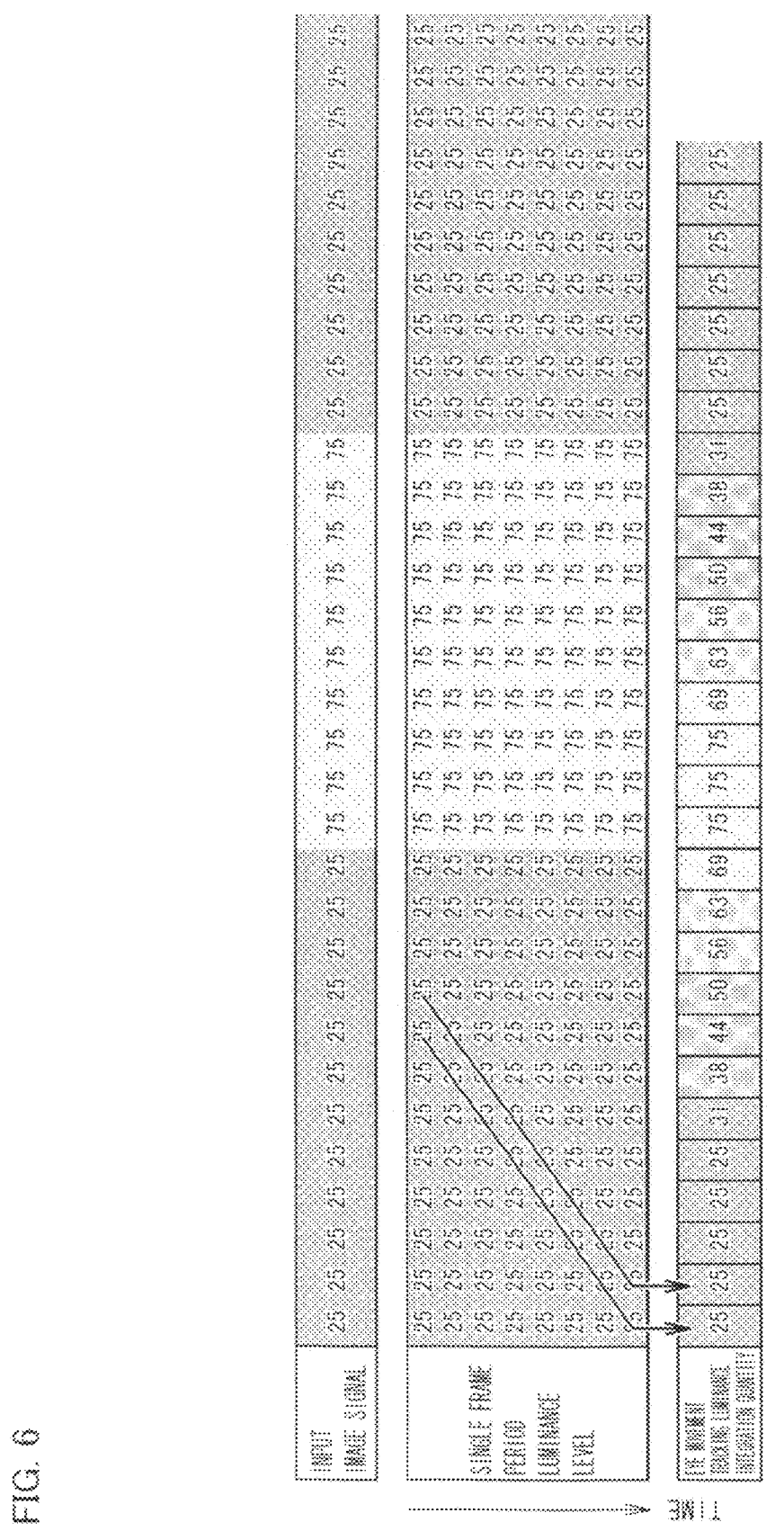

In this case, a luminance level of the virtual sub frame Q image signal, a luminance level of the preconverted image signal, a luminance level of the sub frame A period, a luminance level of the sub frame B period, and an eye movement tracking luminance integration quantity are indicated as numeric values in FIG. 4. Further, a distribution of luminance levels (tracking integration quantities) seen by an observer watching a moving object is as illustrated in FIG. 5. FIG. 6 is a diagram corresponding to FIG. 4 using a conventional image display device. Further, FIG. 7 is a drawing corresponding to FIG. 5 using a conventional image display device.

Note the vicinity of a border of an input luminance level region in FIG. 5. This shows that a blurred edge is improved compared with the conventional image display device of FIG. 7.

EXPERIMENTAL EXAMPLE 2

Figure 7:
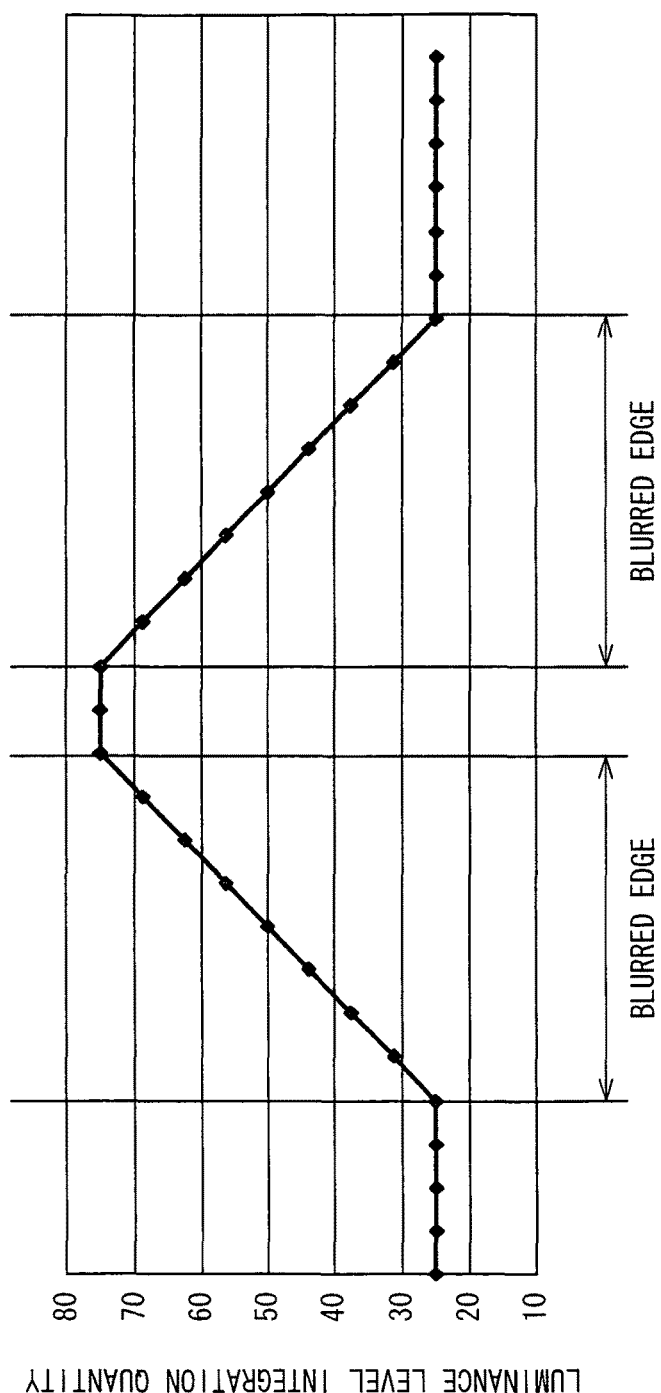
FIG. 7 is a diagram illustrating a distribution of luminance levels which can be viewed by an observer watching a moving object.

Next, as illustrated in FIG. 7, the following explains a single horizontal line of a screen in case where an object whose region has a smaller width than a movement amount in a single frame period and whose luminance level is 75% moves horizontally on a background whose luminance level is 25%.

Figure 8:
FIG. 8 illustrates a state in which a region whose image signal luminance level is 75% moves horizontally on a background whose image signal luminance level is 25%, and illustrates a case where a movement amount on the background whose luminance level is 25% is smaller than a width of the region whose luminance level is 75% in a single frame period.
Figure 9:
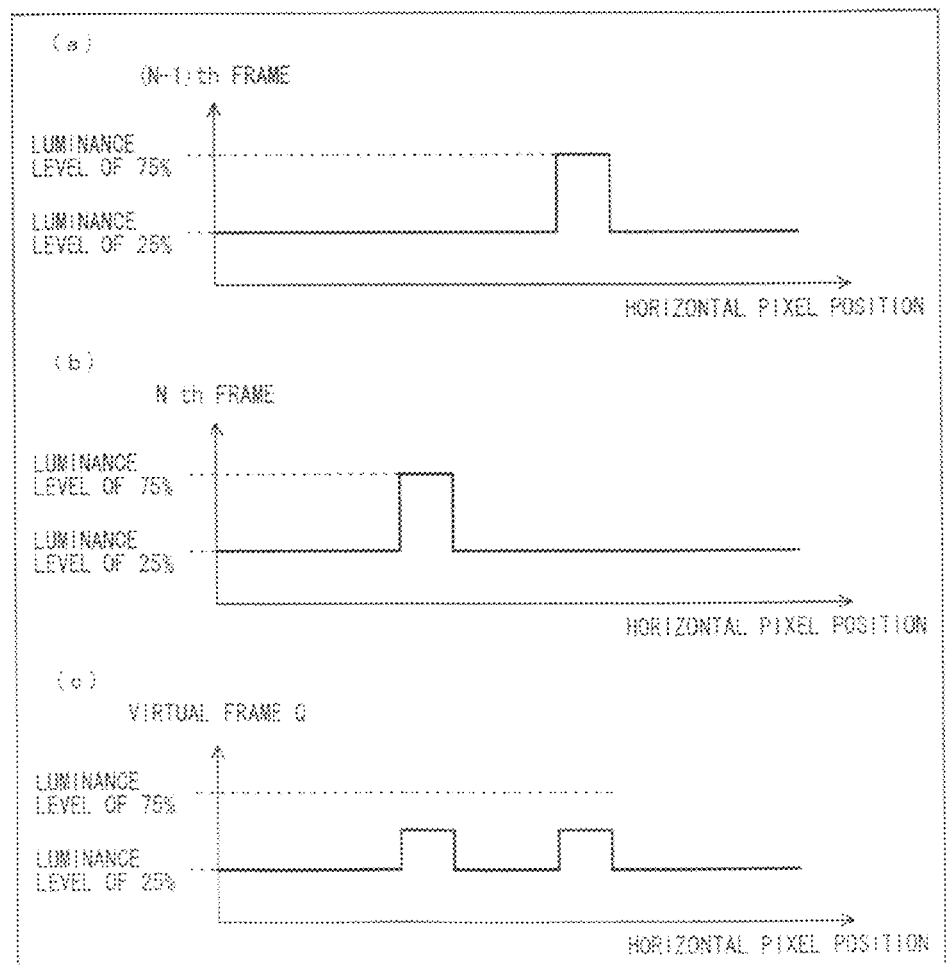
FIG. 9 illustrates luminance levels in a single horizontal line of a screen. (a) illustrates luminance levels at respective horizontal pixel positions in an (N−1)th frame. (b) illustrates luminance levels at respective horizontal pixel positions in an N th frame. (c) illustrates luminance levels at respective horizontal pixel positions in a virtual sub frame Q.

In this case, for example, (a) of FIG. 8 indicates a luminance level distribution of input image signals of the (N−1)th frame, and (b) of FIG. 9 indicates a luminance level distribution of input image signals of the N th frame. (c) of FIG. 9 indicates a luminance level distribution in a single horizontal line of the virtual sub frame Q constituted of an image signal level obtained by averaging input image signals of the N th frame and the (N−1)th frame for each pixel.

Figure 10:
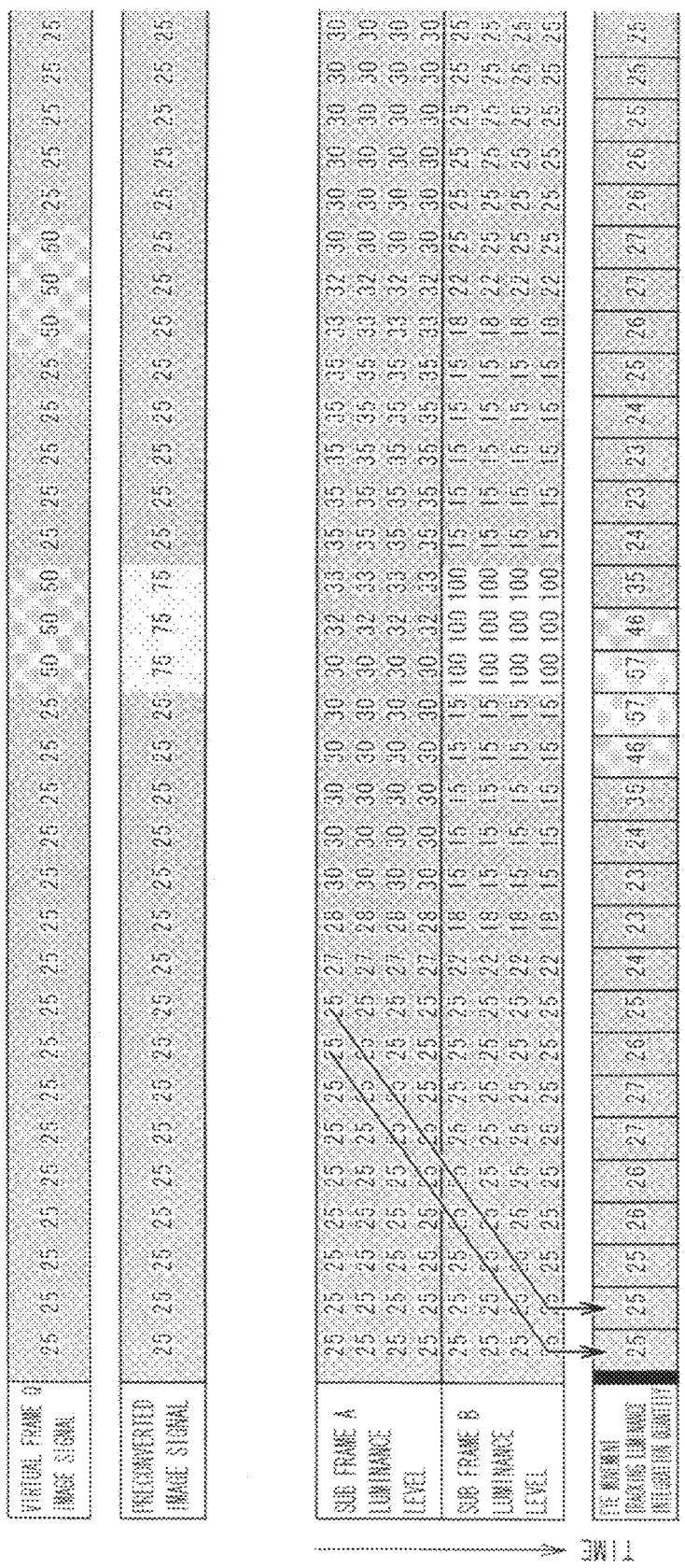
FIG. 10 is a diagram in which numeric values respectively indicate states of luminance levels of pixels within a single frame period.
Figure 11:
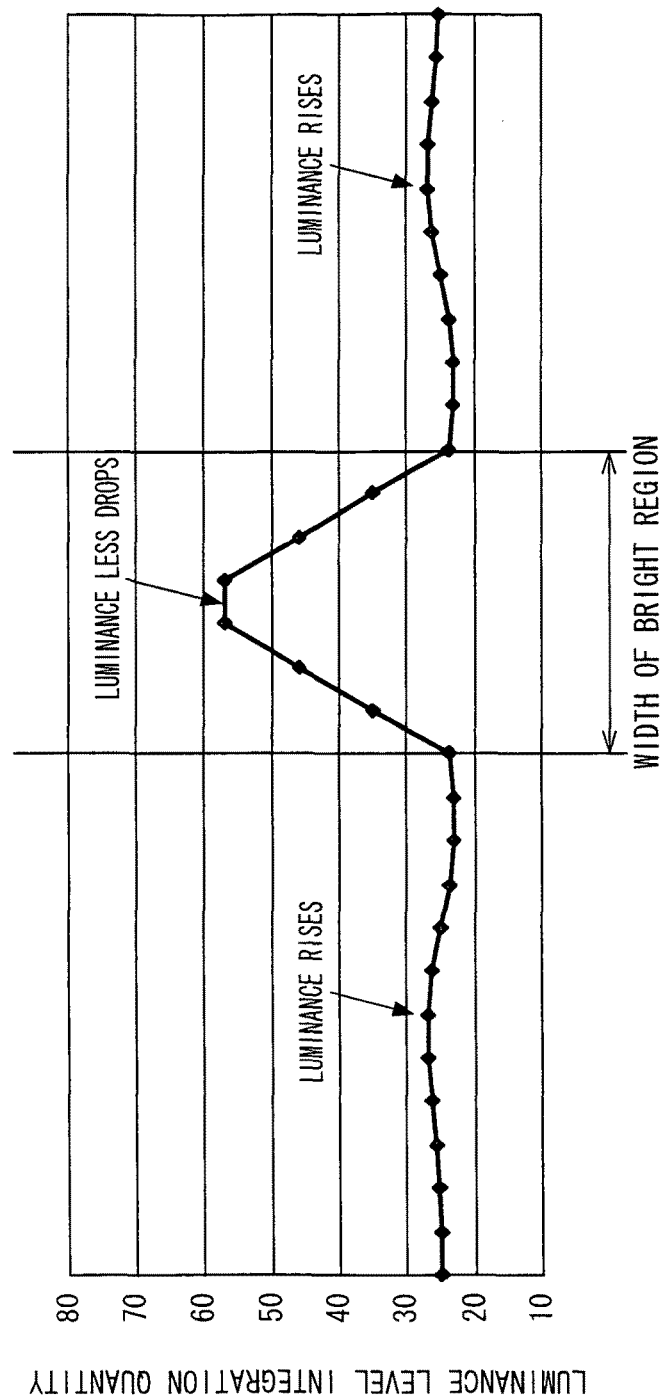
FIG. 11 is a diagram illustrating a distribution of luminance levels which can be viewed by an observer watching a moving object.
Figure 12:
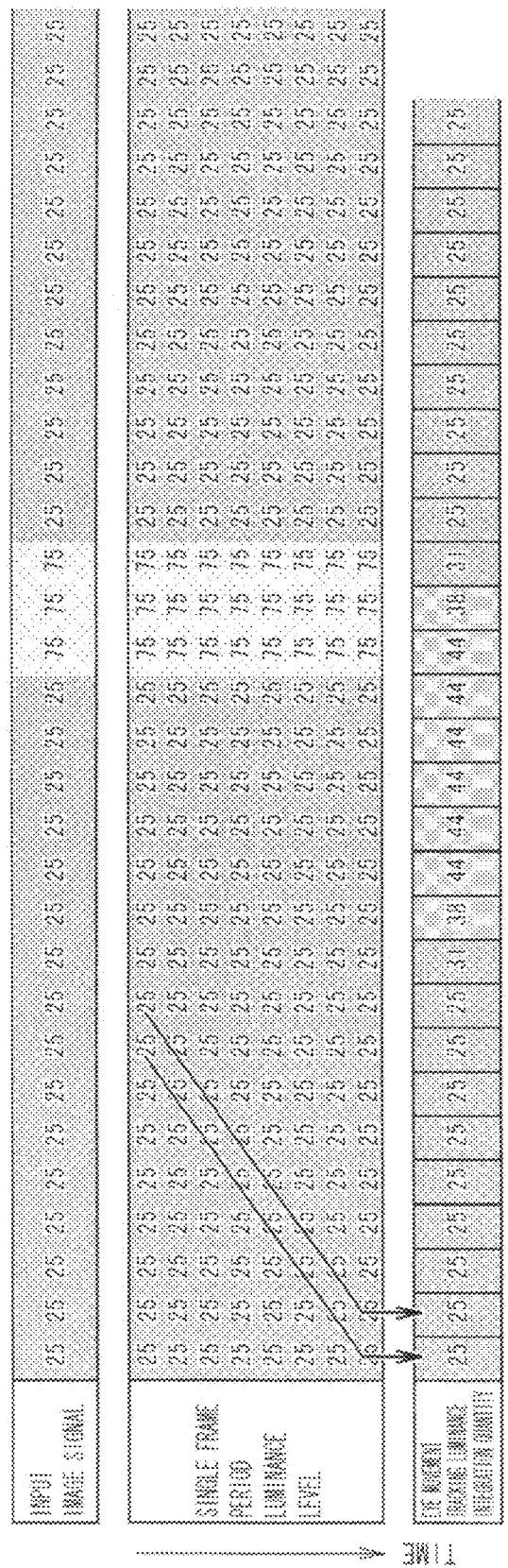
FIG. 12 is a diagram in which numeric values respectively indicate states of luminance levels of pixels within a single frame period.
Figure 13:
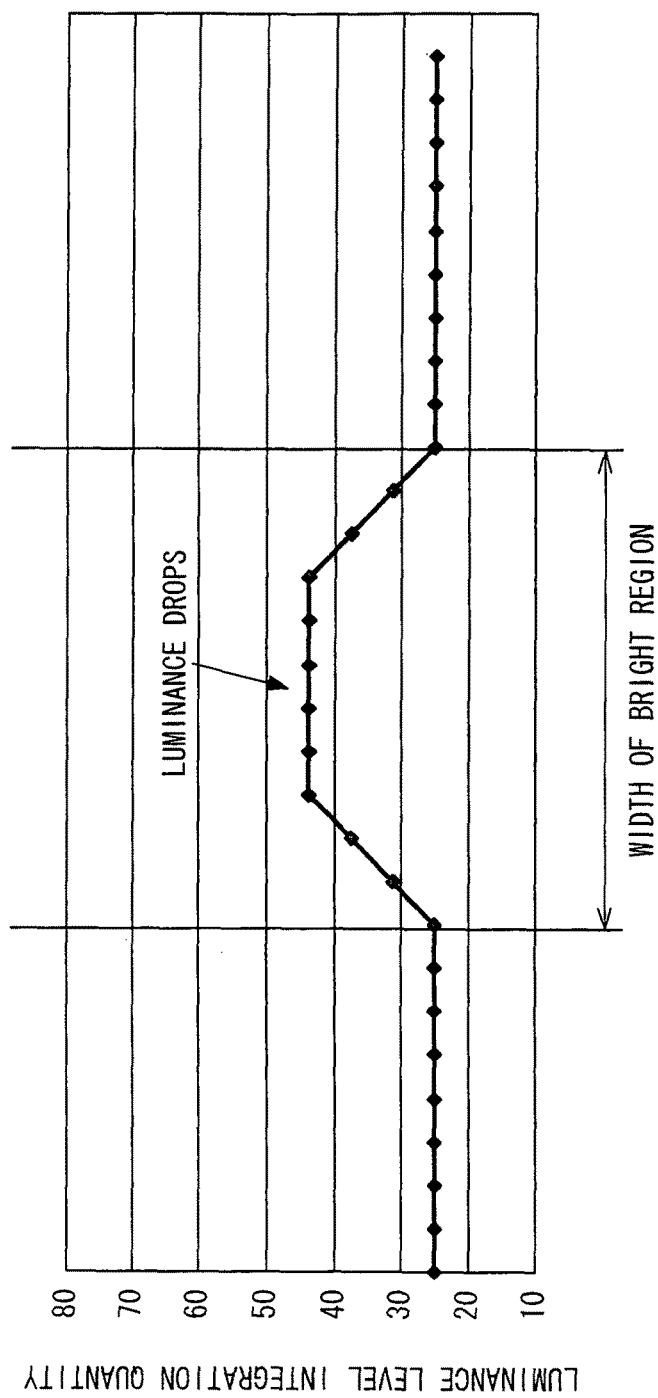
FIG. 13 is a diagram illustrating a distribution of luminance levels which can be viewed by an observer watching a moving object.

At this time, in generating the sub frame A image signal and the sub frame B image signal, image signal levels of the respective pixels in the reference range are equally weighted, and the image signal levels are accumulated with the weighting factors equal to each other, and a total of the accumulated values is divided by a total of the weighting factors for the respective pixels so as to obtain a value. In case of using this value, the luminance level of the virtual sub frame Q image signal, the luminance level of the preconverted image signal, the luminance level of the sub frame A period, the luminance level of the sub frame B period, and a numerical value indicative of the eye movement tracking luminance integration quantity are illustrated in FIG. 10. Further, a distribution of luminance levels (tracking integration quantities) which are seen by an observer watching a moving object is as illustrated in FIG. 11. FIG. 12 is a diagram corresponding to FIG. 10 using a conventional image display device. FIG. 13 is a diagram corresponding to FIG. 11 using a conventional image display device. According to FIG. 11, compared with FIG. 13, the luminance level less drops and a bright area less expands. While, the luminance of a portion whose luminance level should be 25% rises.

EXPERIMENTAL EXAMPLE 3

In the aforementioned Example 2, the respective pixels in the reference range are equally weighted in generating the sub frame A image signal and the sub frame B image signal. Thus, the luminance of a portion whose luminance level should be 25% rises On the other hand, in this Example 3, it is possible to suppress the rise of the luminance by weighting the image signal levels of the respective pixels in the reference range.

Figure 14:
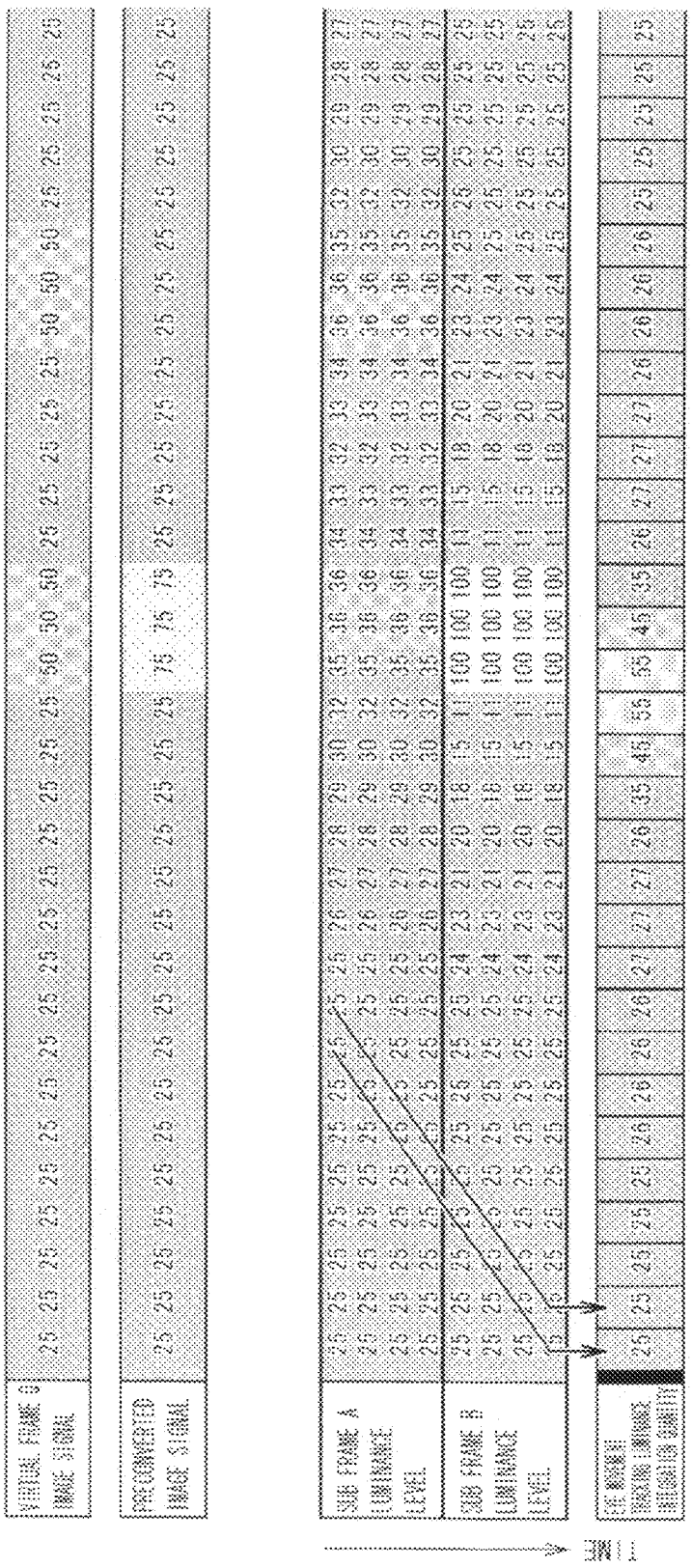
FIG. 14 is a diagram in which numeric values respectively indicate states of luminance levels of pixels within a single frame period.
Figure 15:
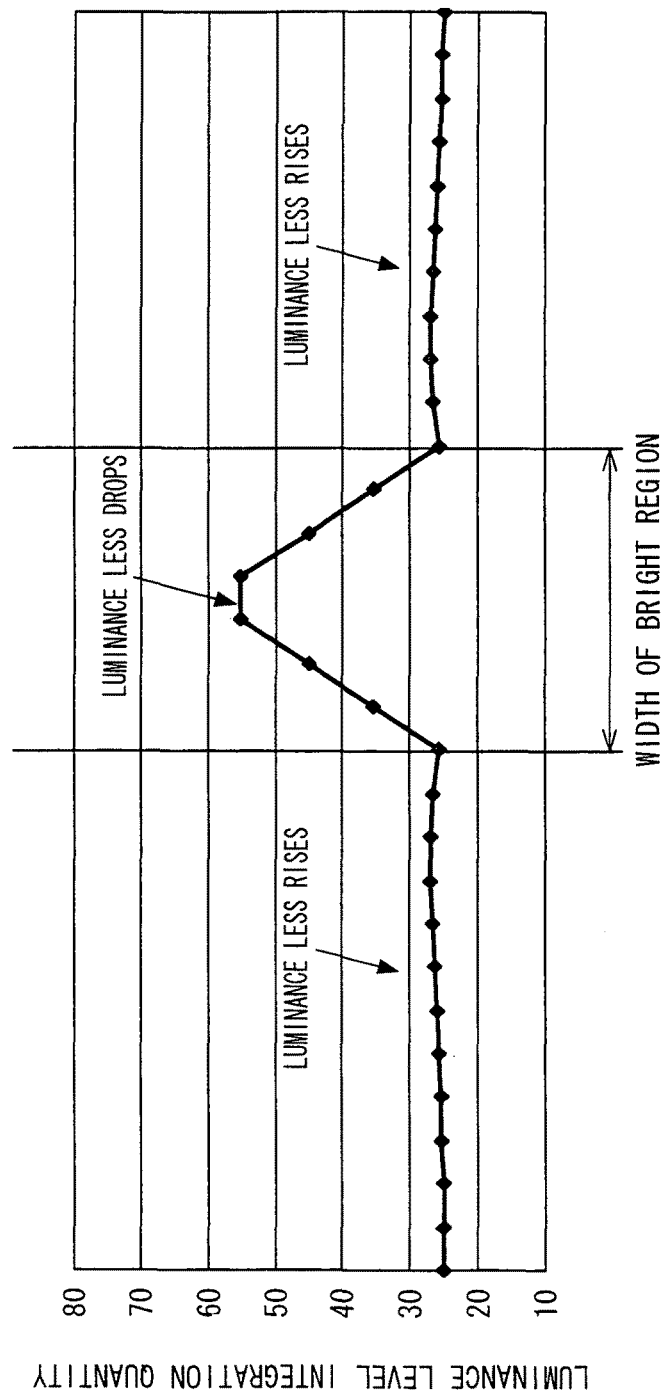
FIG. 15 is a diagram illustrating a distribution of luminance levels which can be viewed by an observer watching a moving object.
Figure 16:
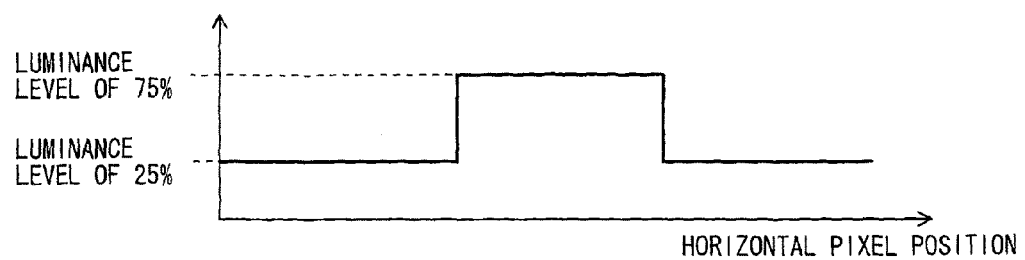
FIG. 16 is a diagram illustrating luminance levels at respective horizontal pixel positions.
Figure 17:
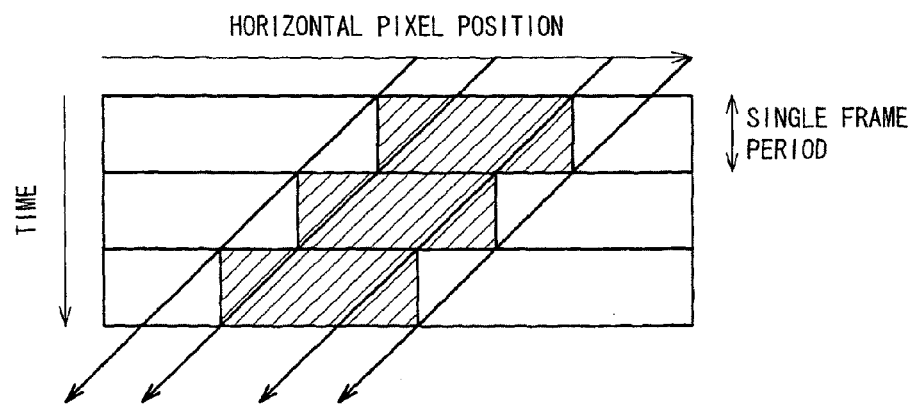
FIG. 17 illustrates temporal transition of a display luminance distribution which is observed in case where images move horizontally.
Figure 19:
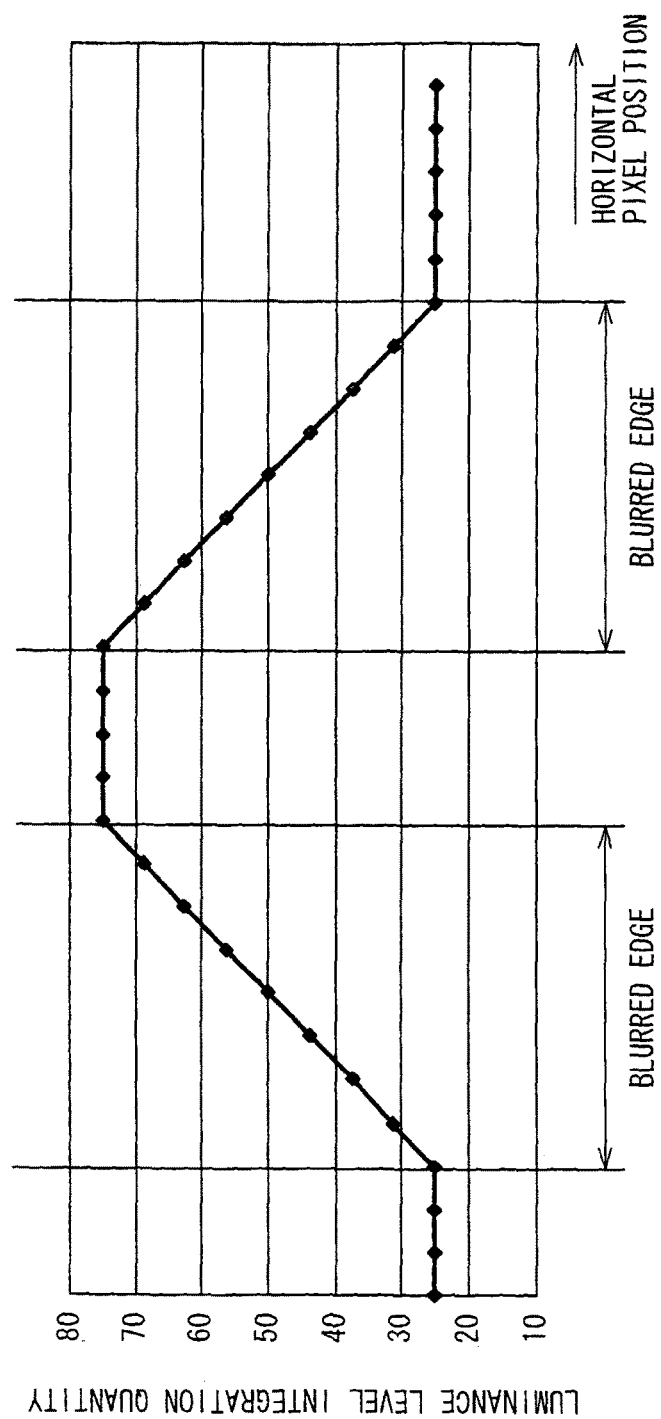
FIG. 19 is a diagram illustrating a distribution of luminance levels which can be viewed by an observer watching a moving object.
Figure 20:
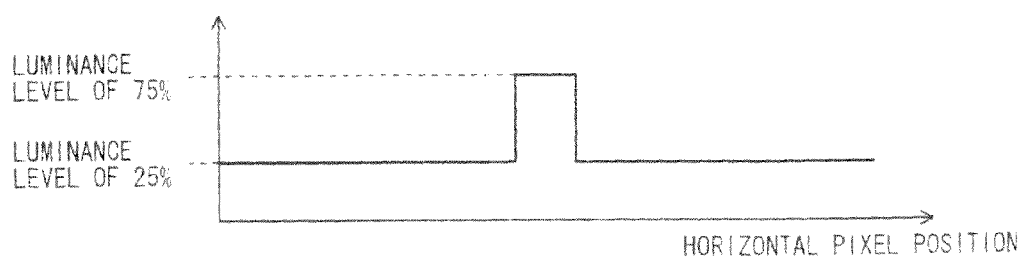
FIG. 20 is a diagram illustrating luminance levels at respective horizontal pixel positions.
Figure 21:
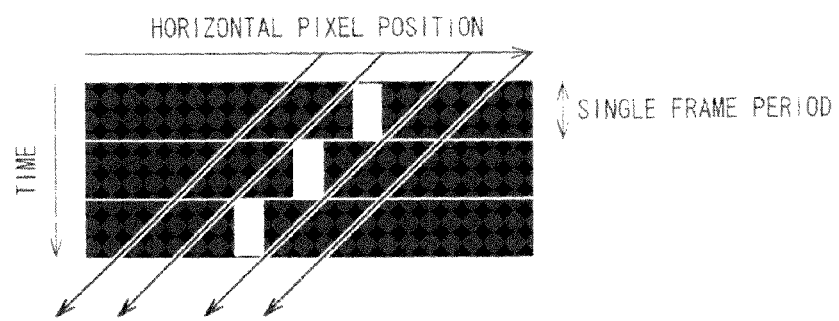
FIG. 21 is a diagram illustrating temporal transition of a display luminance distribution which is observed in case where images move horizontally.
Figure 22:
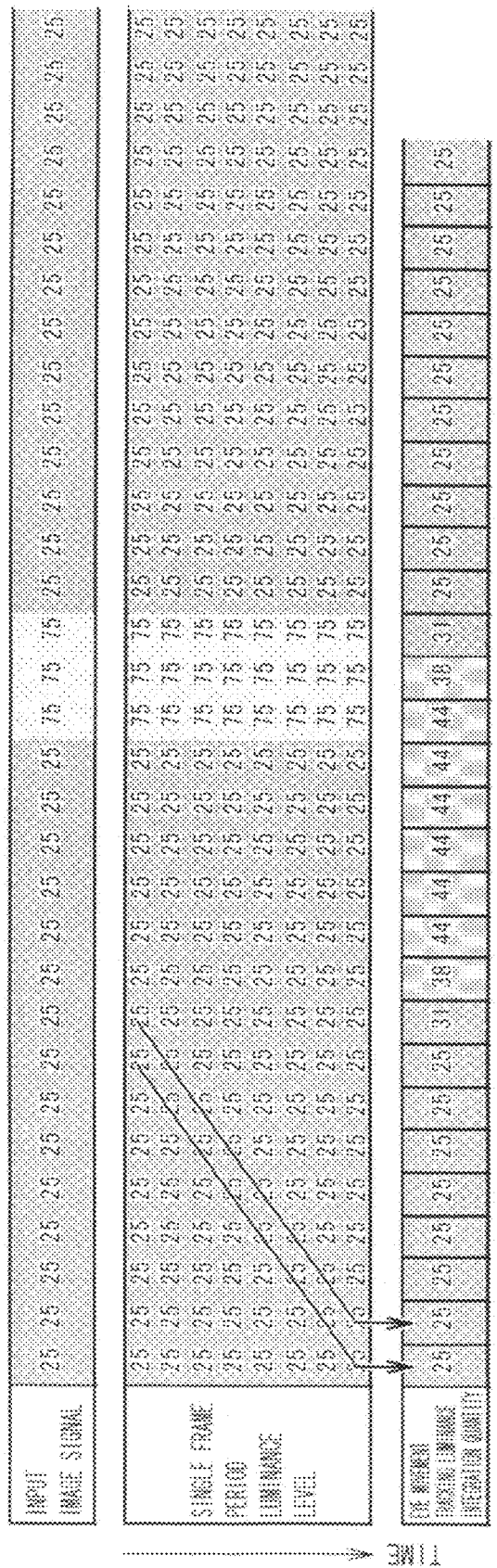
FIG. 22 is a diagram in which numeric values respectively indicate states of luminance levels of pixels within a single frame period.
Figure 23:
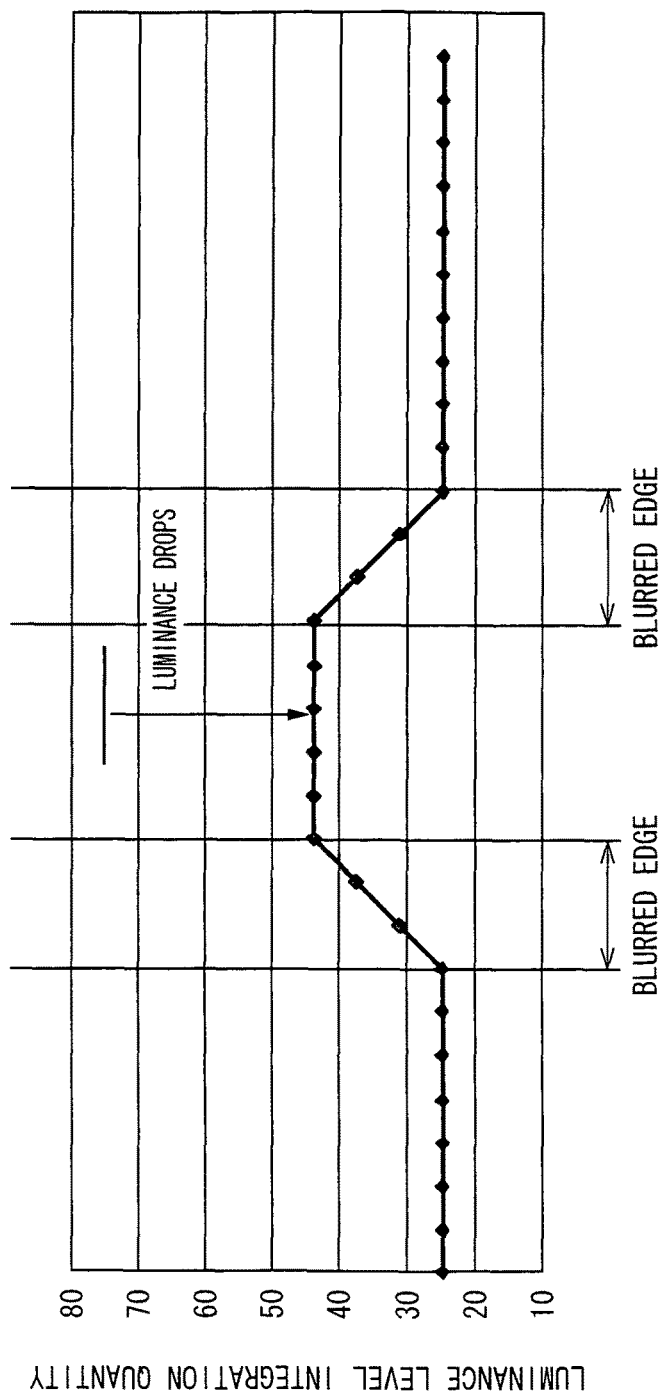
FIG. 23 is a diagram illustrating a distribution of luminance levels which can be viewed by an observer watching a moving object.
Figure 24:
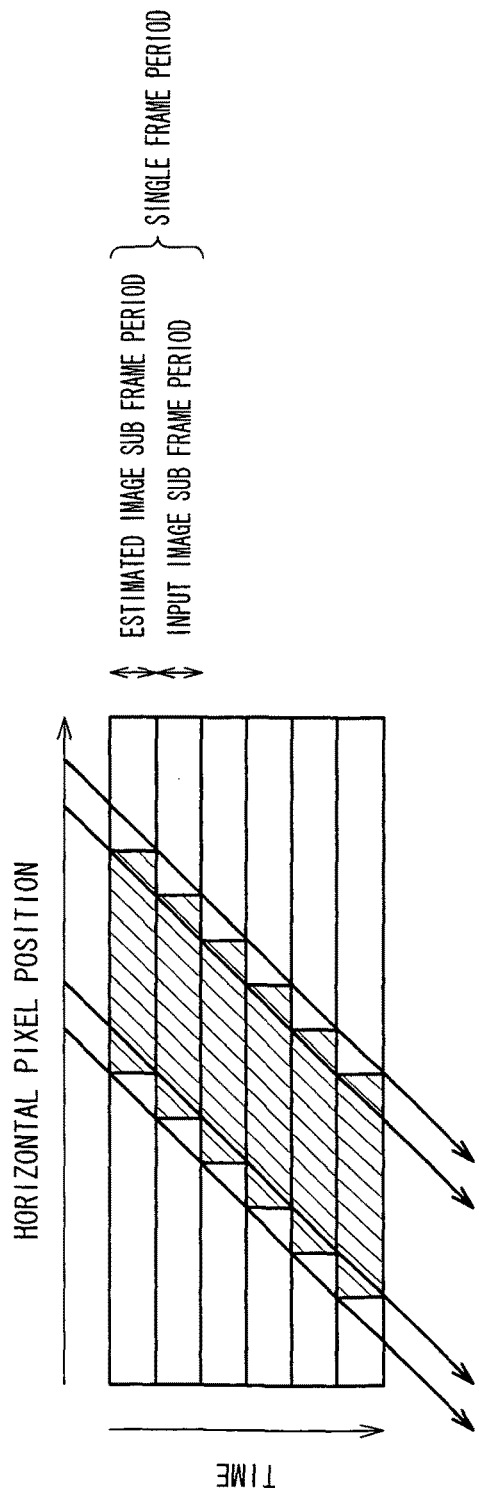
FIG. 24 is a diagram illustrating temporal transition of a display luminance distribution which is observed in case where images move horizontally.
Figure 25:
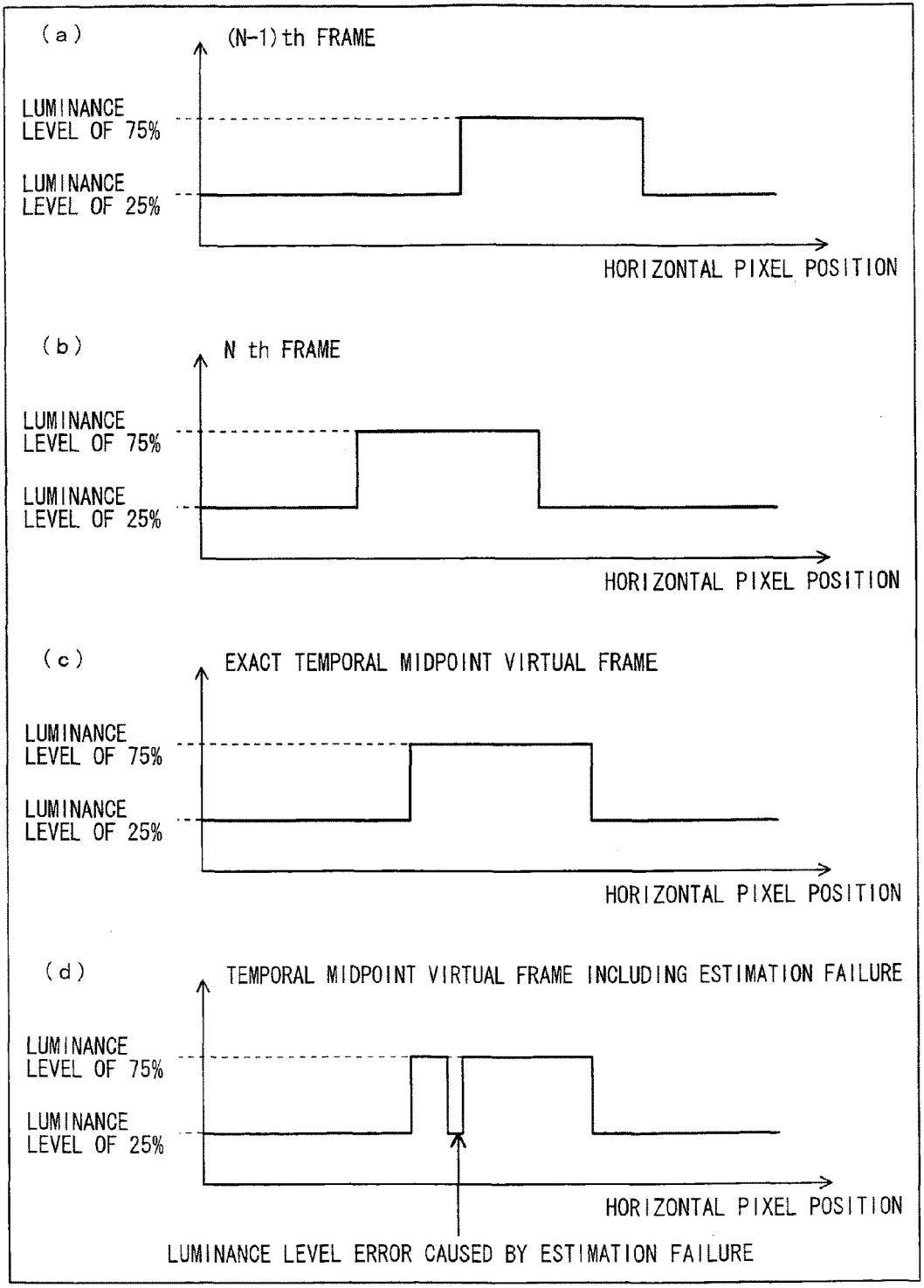
FIG. 25 illustrates luminance levels in a single horizontal line of a screen. (a) illustrates luminance levels at respective horizontal pixel positions in an (N−1)th frame. (b) illustrates luminance levels at respective horizontal pixel positions in an N th frame. (c) illustrates luminance levels at respective horizontal pixel positions in an exact temporal midpoint virtual frame. (d) illustrates luminance levels at respective horizontal pixel positions in a temporal midpoint virtual frame including estimation failure.
Figure 26:
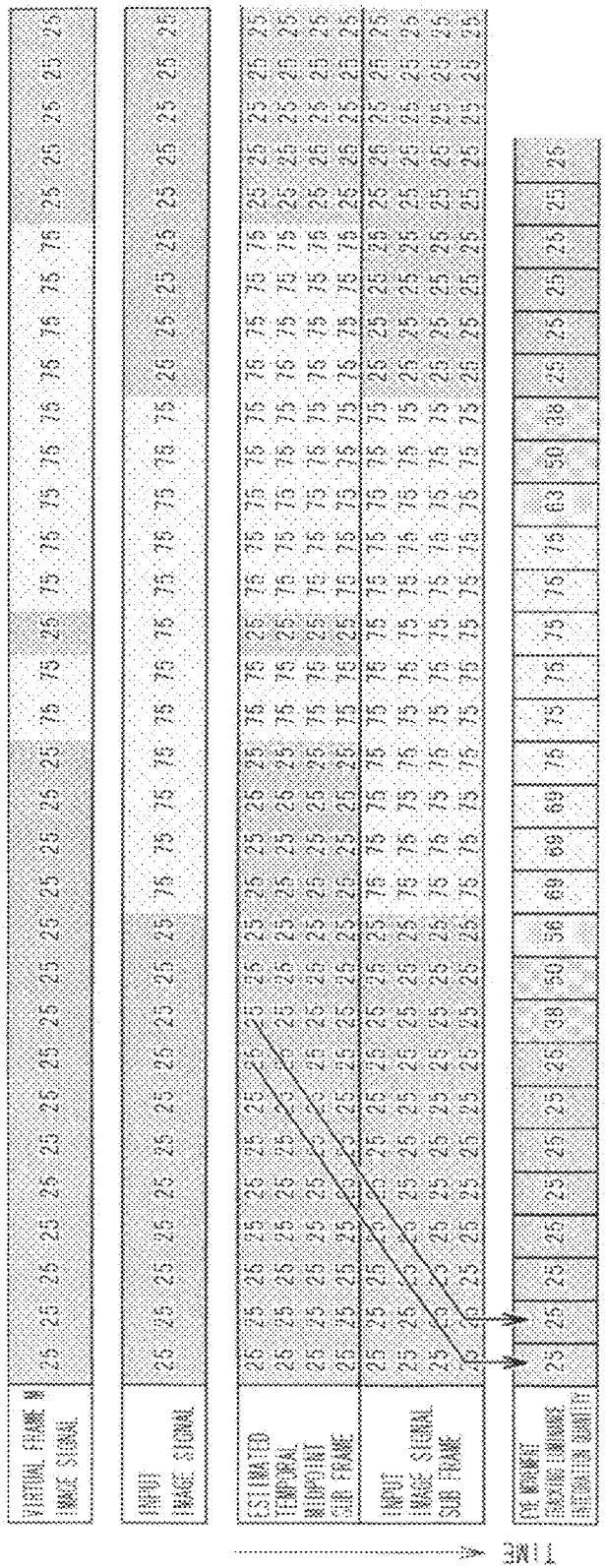
FIG. 26 is a diagram in which numeric values respectively indicate states of luminance levels of pixels within a single frame period.
Figure 27:
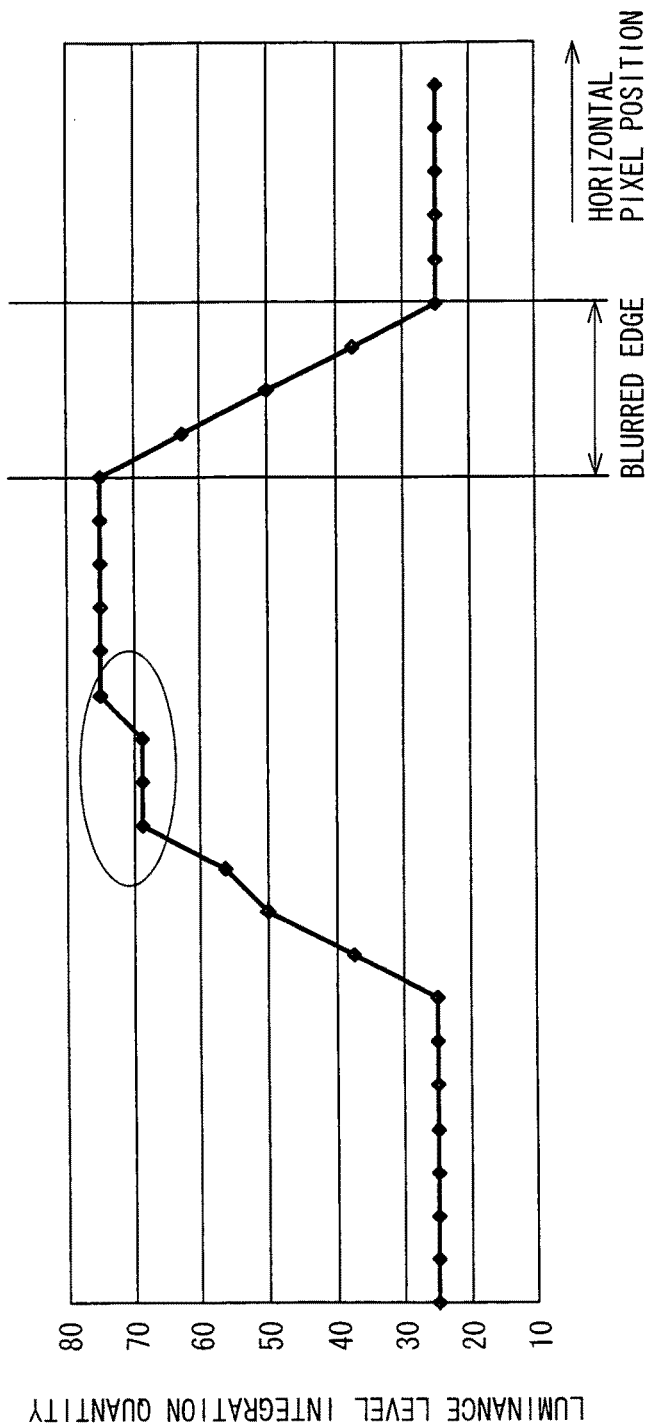
FIG. 27 is a diagram illustrating a distribution of luminance levels which can be viewed by an observer watching a moving object.

Next, in weighting the image signal levels of the respective pixels in the reference range in generating the sub frame A image signal and the sub frame B image signal, the image signal levels are accumulated by more greatly weighting an image signal level of a pixel positioned closer to the target pixel, and a total of the accumulated values is divided by a total of the weighting factors for the respective pixels so as to obtain a value, and this Experimental Example is under the same condition as Experimental Example 2 except that the thus obtained value is used. In this case, the luminance level of the virtual sub frame Q image signal, the luminance level of the preconverted image signal, a luminance level of the sub frame A period, the luminance level of the sub frame B period, and a numeric value indicative of the eye movement tracking luminance integration quantity are illustrated in FIG. 14. A distribution of luminance levels (tracking integration quantities) which are seen by an observer watching a moving object is as illustrated in FIG. 15.

As in the aforementioned Example 2, compared with the conventional example of FIG. 13, the luminance level less drops and the bright region less expands. Further, in case of simple average, compared with the example of FIG. 11 illustrating (Experimental Example 2), rise of the luminance level is suppressed at 25%, i.e., the original luminance level. That is, according to the present Example, it is possible to improve the blurred edge, to reduce drop of the luminance level, and to reduce an error with respect to a luminance level which should be displayed.

[Characteristic Configuration and Effects]

Next, the most important parts of the present invention will be explained.

In case of FIG. 4 of Experimental Example 1, a lowest luminance level of the preconverted image signal is 25%, and a highest luminance level of the preconverted image signal is 75%. At this time, a lowest luminance level of the sub frame B period of FIG. 4 is 2%, and a highest luminance level of the sub frame B period of FIG. 4 is 98%.

In case of FIG. 10 of Experimental Example 2, a lowest luminance level of the preconverted image signal is 25%, and a highest luminance level of the preconverted image signal is 75%. At this time, a lowest luminance level of the sub frame B period of FIG. 10 is 15%, and a highest luminance level of the sub frame B period of FIG. 10 is 100%.

In case of FIG. 14 of Experimental Example 3, a lowest luminance level of the preconverted image signal is 25%, and a highest luminance level of the preconverted image signal is 75%. At this time, a lowest luminance level of the sub frame B period of FIG. 14 is 11%, and a highest luminance level of the sub frame B period of FIG. 14 is 100%.

Thus, in case where the converting section 2 is not provided and an image signal whose luminance level is lower than 25% or whose luminance level is higher than 75% is inputted as an input image signal, an ideal luminance level in the sub frame B may be less than 0% or exceed 100%. However, display cannot be carried out with a luminance level less than 0% or exceeding 100%. In this case, there occurs such a problem that the effect of improving quality of a moving image may be lower than the effect illustrated in FIG. 15.

In the present embodiment, in order to prevent the effect of improving quality of a moving image from dropping, particularly, a converting section 2 is provided, and an input image signal is preconverted. In case of any of the Experimental Examples, a range of the input image signal is converted into 25% to 75% for example.

In this manner, an input image signal whose luminance level (image signal level) ranging from 0% to 100% is preconverted into a luminance level ranging from 25% to 75%, so that it is possible to carry out a sufficient emphasizing process even in case where an input image signal of 0% or 100% is inputted. As a result, it is possible to avoid deterioration of the effect of improving quality of a moving image.

Note that, the luminance level of the input image signal is converted, for example, in accordance with the following equation.

$$Lc = Lmax \times 0.25 + Li \times 0.5$$

where $Li$ represents a luminance level, and $Lc$ represents a luminance level after conversion, and $Lmax$ represents a maximum luminance level of the input image signal.

According to the foregoing equation, in case where the luminance level $Li$ of the input image signal is 100%, the maximum luminance level $Lmax$ of the input image signal is 100%, so that the luminance level $Lc$ after conversion is 25%. The luminance level $Li$ of the input image signal can range from 0% to 100%, so that the luminance level $Lc$ after conversion ranges from 25% to 75%.

Incidentally, in a still image, an image signal level of an image signal in a target pixel of a previous frame is identical to an image signal level of an image signal of a display frame. Thus, a display luminance of the single virtual frame period is ideally identical to a display luminance of an actual single frame period constituted of the sub frame A and the sub frame B.

That is, the display luminance of the still image is ideally identical to a display luminance corresponding to an image signal of a current frame.

However, in the aforementioned display method in which an image signal level of the sub frame A period and an image signal level of the sub frame B period always change for each sub frame period, a complicate response speed calculation circuit or a large-volume signal conversion table is required in order that display luminances, which are based on the aforementioned display method and which correspond to all input image signals, are always identical to display luminances originally indicated by the image signals of the current frame. Each of the circuit and the table results in higher cost.

Further, there is a limitation in the number of grayscales which can be outputted to the image display section 12, so that it may be impossible to make all the image signal levels identical to the display luminances. This raises such a problem that a luminance cannot be displayed exactly.

Particularly, for the foregoing reason, in case where a luminance cannot be displayed exactly in a still image or an image which less moves, quality of an image will be significantly deteriorated. While, a human does not have to recognize a slight luminance error in an image which greatly moves, so that the display luminance does not have to be controlled as strictly as the case of a still image.

Thus, it is preferable to carry out the aforementioned display method in accordance with how a motion degree (degree of motion) of a video changes. However, in case where the aforementioned display method is switched in accordance with a single threshold value, a border line caused by the switching occurs, so that the border line may be seen by an observer.

In the present embodiment for overcoming such a problem, a preferable mode is as follows. If the motion degree is so great that a minute luminance difference is not recognized by an observer, the aforementioned display method is carried out. If the motion degree is so small that a minute luminance difference is recognized by an observer, the aforementioned display method is stopped. Further, in case where the motion degree for carrying out the aforementioned display method is set as a first threshold value and the motion degree for stopping the aforementioned display method is set as a second threshold value, when a motion degree is between the first threshold value and the second threshold value, the sub frame A image signal and the sub frame B image signal used in the aforementioned display method may be changed in accordance with a change of the motion degree.

Specifically, (a) in case where the motion degree calculated by the detecting section 3 is greater than the first threshold (in case of displaying an image which moves more greatly than a predetermined amount), the first image processing section 46 and the second image processing section 47 are used in the foregoing manner to generate the sub frame A image signal and the sub frame B image signal, and (b) in case where the motion degree calculated by the detecting section 3 is smaller than the first threshold value and greater than the second threshold value (<threshold value), the first image processing section 46 and the second image processing section 47 give a limitation (correction) so that a value of each of the sub frame A image signal and the sub frame B image signal is more approximate to the preconverted input image signal as the motion degree is smaller, and (c) in case where the motion degree calculated by the detecting section 3 is sufficiently small (smaller than the second threshold value) or in case of a still image, the first image processing section 46 and the second image processing section 47 cause the sub frame A image signal and the sub frame B image signal to be identical to the preconverted image signal.

That is, in accordance with the motion degree obtained by using the detecting section 3, a range which can be indicated by the sub frame A image signal and the sub frame B image signal in response to the preconverted input image signal is limited by a signal level difference, a signal level ratio, and the like.

According to the foregoing configuration, in the case (a) showing a particularly great motion, regardless of an image signal level of an input image signal, quality of a moving image can be kept by carrying out the smoothing process and the emphasizing process. In the case (b) showing a smaller motion than the case (a), both the quality of a moving image and the exact luminance display can be kept.

Next, the image signal preconverting section 2 will be described. If a display luminance level is too high in response to a minimum luminance level, a black display appears to be gray, so that the contrast performance deteriorates. Further, if a display luminance is too low in response to the maximum luminance level, a display maximum luminance performance deteriorates.

Thus, in converting a lower limit rated value applied in response to a minimum image signal into a certain image signal or in converting an upper limit rated value applied in response to a maximum image signal into a certain image signal, it is preferable that the converted image signal is adjusted at the design stage in accordance with an expected video, a display environment, and the like, or it is preferable that a user switches the converted image signal.

As a conversion method adopted in case where an intermediate input image signal is inputted, there is performed such nonlinear conversion that an appropriate gamma luminance property is reproduced between image signals respectively corresponding to the lower limit rated value and the upper limit rated value, thereby making the gamma luminance property appropriate in an actually displayed image.

Specific examples of the image signal conversion method includes: a method in which a calculation circuit or a calculation program carries out calculation for conversion; a method in which a signal level converted in response to each signal level of an input image signal is kept in a conversion table in advance; and a similar method.

Examples of a method for a user to change a conversion mode include: a method in which a parameter of a calculation circuit or a calculation program is made variable; and a method in which a plurality of conversion tables are made switchable.

Further, the nonlinear signal conversion circuit results in higher cost, so that it may be so arranged that linear proportional conversion is carried out as conversion of the intermediate image signal.

In this case, the gamma luminance property of the image display section 12 (e.g., a liquid crystal panel module) is adjusted so that an appropriate gamma luminance property is reproduced between the lower limit rated value and the upper limit rated value of the image signal, thereby carrying out an image display whose gamma luminance property is appropriate.

Note that, in case where a black luminance is decreased so as to obtain a sufficient contrast performance instead of improving quality of a moving image, an image signal level corresponding to a minimum luminance which can be displayed by the image display section 12 is set as the lower limit rated value. While, in case of obtaining a maximum display luminance performance instead of improving quality of a moving image, an image signal level corresponding to a maximum luminance which can be displayed by the image display section 12 is set as the upper limit rated value.

Incidentally, in case of carrying out a signal process in a pixel close to an end of the screen, the reference range centering the target pixel therein may partially deviate from an image display range. In this case, an appropriate signal process cannot be carried out.

On the other hand, as described above, a border line may be generated in a video by switching the aforementioned display method. Thus, as a distance between the target pixel and a closer end of the screen, there is determined a distance D1 which is such a shortest distance that the reference range is within the screen, and there is determined as a distance D2 which is longer than the distance D1. The distance D1 may be such a distance that the reference range slightly deviates from the screen. Further, in case where a distance d between the target pixel and a closer end of the screen is not less than D1 and less than D2, the aforementioned process (b) is carried out. Due to the distance D2, the aforementioned display method realizes effect of improving quality of a moving image in a large part of the screen. Further, due to the distance D2, it is possible to keep a range realized by the process (b) for preventing the observer from recognizing the border line caused by the switching.

Specifically, in the present embodiment, when a vertical or horizontal distance from the closer end of the screen to the pixel is determined as d and $0<D1 \leq D2$, (d) in case where $D2 \leq d$, the first image processing section 46 and the second image processing section 47 carry out the smoothing process and the emphasizing process, and (e) in case where $D1 \leq d < D2$, the first image processing section 46 and the second image processing section 47 give a limitation so that a difference between the output image signal and the preconverted input image signal is small, and (f) in case where $d<D1$, the first image processing section 46 and the second image processing section 47 display and output the preconverted input image signal without any modification as an output image signal.

Note that, the distance d from the pixel to the end of the screen is detected by the sub frame A image signal generating section 46 and the sub frame B image signal generating section 47.

Due to such a process, it is possible to carry out a display method, similar to the conventional method, in which it is not necessary to refer to peripheral pixels in the vicinity of the end of the screen arranged so that $d<D1$, and it is possible to carry out a display method in which the aforementioned blurred motion is improved in a large part of the screen which large part is positioned farther away from the end of the screen arranged so that $d \geq D2$.

Further, in the pixel arranged so that $D1 \leq d < D2$, a display method similar to the conventional method is gradually switched to the aforementioned display method for improving blurred motion as d becomes greater, so that a display image signal level does not drastically change even in case where a displayed object moving on the screen moves beyond a border line at which the display method changes, so that a strange feeling of the video is hardly recognized.

Further, if the end of the screen which end is closer to the pixel is positioned in a vertical direction, D1 and D2 are respectively defined as Dy1 and Dy2, and if the end of the screen which end is closer to the pixel is positioned in a horizontal direction, D1 and D2 are respectively defined as Dx1 and Dx2. In this case, it is preferable that $Dy1<Dx1$ and $Dy2<Dx2$.

Further, it may be so that Dy1 is 5% or less with respect to a vertical image length and Dx1 is 5% or less with respect to a horizontal image length, and it may be so that Dy2 is 10% or less with respect to the vertical image length and Dx2 is be 10% or less with respect to the horizontal image length.

Note that, in the foregoing descriptions, the sub frame A image signal is calculated in accordance with an image signal of the virtual frame Q, but the configuration is not limited to this, and it may be so configured that the virtual frame Q is not generated and the sub frame A image signal is calculated in accordance with the input image signal calculated by the image signal preconverting section 2. In this case, an image is slightly impaired due to deviation of a relationship between time space and luminance centroid with respect to an observer watching an object moving on the screen, but quality of an image is expected to be improved to some extent.

Further, there was described the case where a single frame period is divided into the two sub frame periods, i.e., the sub frame A and the sub frame B period, but the configuration is not necessarily limited to this, and it may be so configured that the single frame period is divided into three sub frame periods.

Figure 28:
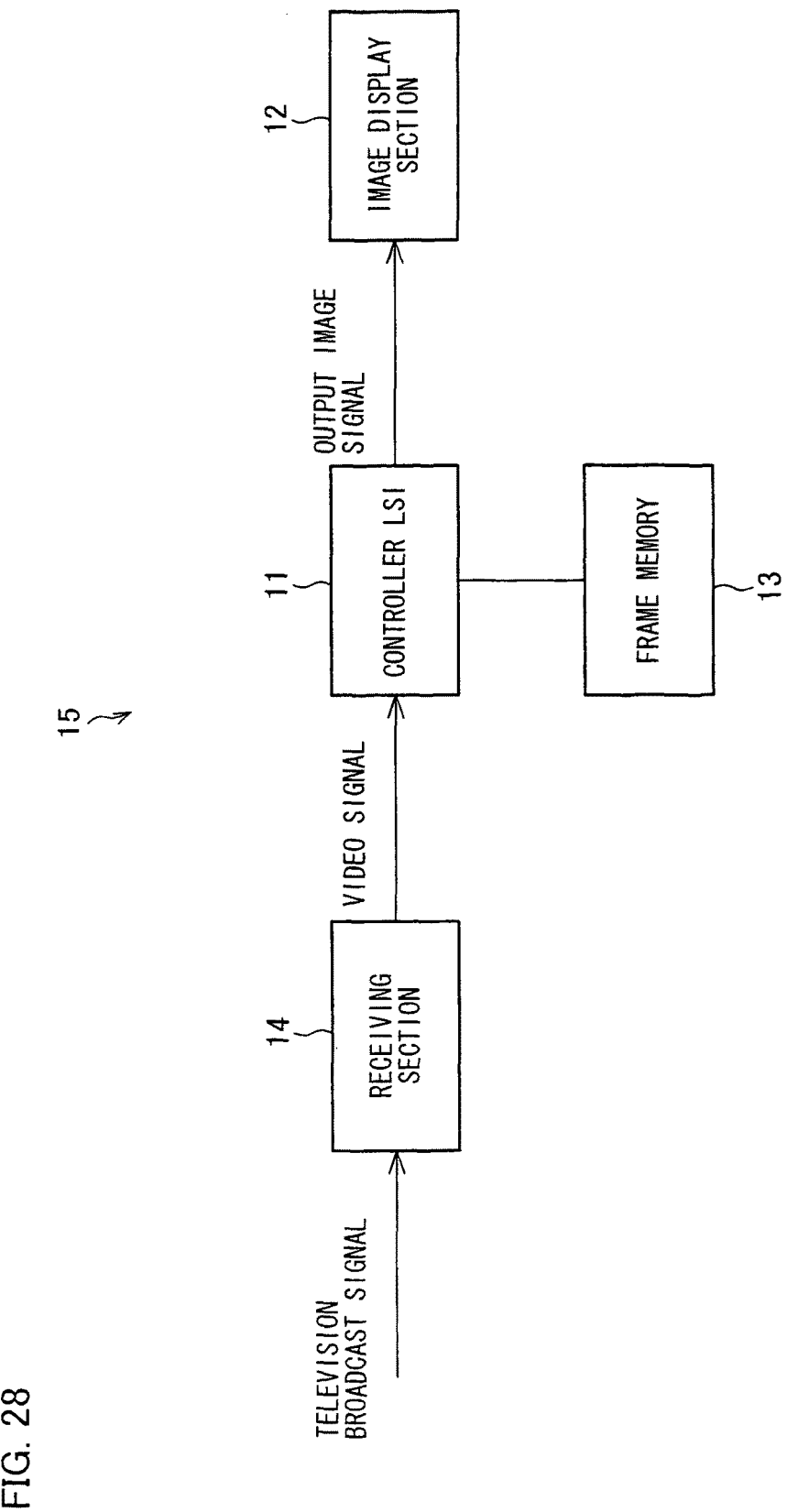
FIG. 28 is a block diagram illustrating an example of a configuration of an image display device which operates as a liquid crystal television receiver.

Further, as illustrated in FIG. 28, the image display device of the present invention can be configured as a liquid crystal television receiver for example. That is, it may be so configured that: there is provided a receiving section 14 which selects a channel as a tuner section, and receives television broadcast, and inputs a video signal indicative of a video transferred by the television broadcast to a controller LSI1 as an input image signal. The controller LSI1 includes a frame memory 13 which can read and write the input image signal. Further, the image display section 12 includes a liquid crystal panel and can be configured so as to display an image based on an output image signal transmitted from the controller LSI1.

Further, the present invention can be expressed also as follows.

In addition to the basic operations of Patent Document 3, the following functions and effects are added.

1. An input signal is compression-converted in order to prevent/reduce a case where: an ideal emphasized luminance is less than 0% and more than 100% and thus a moving image performance deteriorates.

2. It is difficult to always exactly express grayscales due to repetition of two (blurring/emphasizing) grayscale expressions, so that the display is returned to a normal display in case of a still image.

3. There is reduced impairment of quality of an image which impairment is caused by more greatly weighting an image signal level of a pixel positioned closer to the target pixel and averaging the weighted values at the time of the blurring calculation.

4. The vicinity of the end of the screen is controlled so that the reference range does not deviate from the screen region.

The present invention is not limited to the description of the embodiments above, but may be altered by a skilled person within the scope of the claims. An embodiment based on a proper combination of technical means disclosed in different embodiments is encompassed in the technical scope of the present invention.

According to the embodiments above, the present invention is summarized as follows. That is, an image display device of the present invention displays an image in accordance with image signals of respective pixels in each frame period wherein a frame period corresponds to image signals for a single screen, said image display device comprising: a dividing section for dividing a single frame period into a plurality of periods including at least one sub frame A period and at least one sub frame B period; a converting section for converting image signal levels of input image signals for the respective pixels so that the converted image signal levels are within a range from a predetermined lower limit to a predetermined upper limit; a first image processing section for carrying out a smoothing process with respect to the converted image signals of the respective pixels in the sub frame A period; a second image processing section for carrying out an emphasizing process with respect to the converted image signals of the respective pixels in the sub frame B period; and an image display section for displaying an image in accordance with (i) the image signals which have been subjected to the smoothing process by the first image processing section and which correspond to the respective pixels and (ii) the image signals which have been subjected to the emphasizing process by the second image processing section and which correspond to the respective pixels.

Further, an image display method of the present invention, an image is displayed in accordance with image signals of respective pixels in each frame period wherein a frame period corresponds to image signals for a single screen, said image display method comprising: dividing a single frame period into a plurality of periods including at least one sub frame A period and at least one sub frame B period; converting image signal levels of input image signals for the respective pixels so that the converted image signal levels are within a range from a predetermined lower limit to a predetermined upper limit; and carrying out a smoothing process with respect to the converted image signals of the respective pixels in the sub frame A period and for carrying out an emphasizing process with respect to the converted image signals of the respective pixels in the sub frame B period.

According to the present invention, a single frame period is divided into a plurality of periods including at least one sub frame A period and at least one sub frame B period, and there are provided: a first image processing section for carrying out a smoothing process with respect to image signals of the respective pixels in the sub frame A period; and a second image processing section for carrying out an emphasizing process with respect to image signals of the respective pixels in the sub frame B period. In this manner, by carrying out the smoothing process in the one sub frame period, a difference between an image signal level of the target pixel and an image signal level of a peripheral pixel becomes small, and by carrying out the emphasizing process in the other sub frame period, the difference between the image signal level of the target pixel and the image signal level of the peripheral pixel becomes great, but a luminance in a broad range in each sub frame hardly drops or hardly rises, so that it is possible to improve quality of a moving image of a hold type display device without dropping a luminance and without bringing bout any flickers.

However, in case where an input image signal to be inputted is approximate to a maximum image signal level or a minimum image signal level, an image signal level cannot be made higher than the maximum image signal level and the image signal level cannot be made lower than the minimum image signal level even in trying to carry out the emphasizing process, so that the emphasizing process cannot be carried out, which results in such a problem that it is impossible to improve quality of a moving image.

In order to solve the problem, the present invention comprises a converting section for converting image signal levels of input image signals for the respective pixels so that the converted image signal levels are within a range from a predetermined lower limit to a predetermined upper limit. Thus, image signal levels of the input image signals can be converted so that the converted image signal levels are within a predetermined certain range. Therefore, the emphasizing process can be carried out regardless of the image signal levels of the inputted image signals, so that it is possible to carry out an appropriate emphasizing process. Thus, it is possible to improve quality of a moving image (it is possible to obtain a high-quality moving image) regardless of the image signal level of the inputted image signal.

It is preferable to configure the image display device of the present invention so that: the first image processing section calculates an average value of the converted input image signal levels of pixels included in a reference range having a target pixel so that the smoothing process uses the average value as each image signal level of the pixels in the reference range.

It is preferable to configure the image display method of the present invention so that: the smoothing process calculates an average value of the converted input image signal levels of pixels included in a reference range having a target pixel so that the smoothing process uses the average value as each image signal level of the pixels in the reference range.

According to the foregoing configurations, the first image processing section calculates an average value of the converted input image signal levels of pixels included in a reference range having a target pixel so that the average value corresponds to an image signal level of the target pixel. That is, the converted input image signals are used to carry out the smoothing process. Thus, it is possible to carry out the smoothing process in a simple manner.

It is preferable to configure the image display device of the present invention so as to further comprise a virtual sub frame generating section for generating a virtual sub frame whose signal level corresponds to an intermediate value of the converted input image signal levels for target pixels of consecutive two input frames, wherein the first image processing section calculates an average value of the converted input image signal levels of pixels included in a reference range having a target pixel in the virtual sub frame so that the smoothing process uses the average value as each image signal level of the pixels in the reference range.

It is preferable to configure the image display method of the present invention so as to further comprises: generating a virtual sub frame whose signal level corresponds to an intermediate value of the converted input image signal levels for target pixels of consecutive two input frames, and wherein the smoothing process calculates an average value of the converted input image signal levels of pixels included in a reference range having a target pixel in the virtual sub frame so that the smoothing process uses the average value as each image signal level of the pixels in the reference range.

The sub frame A period is constituted in accordance with the virtual sub frame, so that it is possible to avoid impairment of a quality of an image which impairment is caused by deviation of a relationship between time space and luminance centroid with respect to an observer watching an object moving on the image.

It is preferable to configure the image display device of the present invention so that: the second image processing section carries out the emphasizing process so that a time-based integration quantity of a luminance level of the image display section in a single frame period which luminance level changes due to changes of the image signal levels of the respective pixels within the single frame period is identical to a time-based integration quantity of the luminance level of the image display section which luminance level is observed in case where the image becomes still at the converted image signal levels, said single frame period including the sub frame A period and the sub frame B period.

It is preferable to configure the image display method of the present invention so that: the emphasizing process is carried out so that a time-based integration quantity of a luminance level of the image display section in a single frame period which luminance level changes due to changes of the image signal levels of the respective pixels within the single frame period is identical to a time-based integration quantity of the luminance level of the image display section which luminance level is observed in case where the image becomes still at the converted image signal levels, said single frame period including the sub frame A period and the sub frame B period.

According to the foregoing configurations, in carrying out the emphasizing process, the second image processing section carries out the process so that a time integration quantity of a luminance level of the image display section in a single frame period which luminance level changes due to changes of the image signal levels of the respective pixels in the single frame period is identical to a time integration quantity of the luminance level of the image display section which luminance level is observed in case where the image becomes still at the converted image signal levels, said single frame period including the sub frame A period and the sub frame B period. Thus, it is possible to reduce the motion blurring while suppressing a difference between an image luminance distribution expected in accordance with the input image signal and an image luminance distribution perceived by the observer.

It is preferable to configure the image display device of the present invention so that: the first image processing section accumulates the converted image signal levels for the pixels included in the reference range while more greatly weighting an image signal level of a pixel positioned closer to the target pixel, and averages the accumulated values for the pixels included in the reference range.

It is preferable to configure the image display method of the present invention so that: in the smoothing process, the converted image signal levels for the pixels included in the reference range are accumulated while more greatly weighting an image signal level of a pixel positioned closer to the target pixel, and the accumulated values for the pixels included in the reference range.

According to the foregoing configurations, compared with a case of simple averaging, it is possible to reduce impairment of a quality of an image which impairment is caused by an error between (i) a luminance which should be essentially displayed in watching a moving video and (ii) a luminance which is actually perceived.

It is preferable to configure the image display device of the present invention so that: the converting section carries out linear proportional conversion with respect to the input image signals.

According to the foregoing configuration, the linear proportional conversion is carried out, so that it is not necessary to prepare a complicate circuit for conversion. Thus, for example, it is possible to carry out the conversion with a simple circuit arrangement.

It is preferable to configure the image display device of the present invention so that: the converting section carries out nonlinear conversion so that a display luminance property in the image display section shows an appropriate gamma property while the image signal levels are within the range from the lower limit to the upper limit.

According to the foregoing configuration, the converting section carries out nonlinear conversion so that a display luminance property in a range from the lower limit to the upper limit in the image display section shows an appropriate gamma property. Thus, the gamma property in an actually displayed image can be made appropriate.

It is preferable to configure the image display device of the present invention so that: a difference between a luminance level of the image display section which luminance level corresponds to the upper limit and a maximum luminance level which can be displayed by the image display section is not more than 25% with respect to a difference between the maximum luminance level which can be displayed by the image display section and a minimum luminance level which can be displayed by the image display section.

In this case, it is possible to display an image so that drop of a display luminance is suppressed to a certain extent while greatly improving quality of a moving image based on an image signal corresponding to an input image signal whose luminance level is the maximum level or is approximate to the maximum level.

It is preferable to configure the image display device of the present invention so that: a difference between a luminance level of the image display section which luminance level corresponds to the upper limit and a maximum luminance level which can be displayed by the image display section is not more than 10% with respect to a difference between the maximum luminance level which can be displayed by the image display section and a minimum luminance level which can be displayed by the image display section.

In this case, it is possible to display an image so that a display luminance less drops while improving quality of a moving image to a certain extent on the basis of an image signal corresponding to an input image signal whose luminance level is the maximum level or is approximate to the maximum level.

It is preferable to configure the image display device of the present invention so that: a luminance level of the image display section which luminance level corresponds to the lower limit is equal to a minimum luminance level which can be displayed by the image display section.

According to the foregoing configuration, when a display luminance observed in response to a minimum luminance level becomes high, a black display appears to be gray, which results in a lower contrast performance. However, according to the foregoing configuration, a luminance level of the image display section which luminance level corresponds to the lower limit is made equal to a minimum luminance level which can be displayed by the image display section, so that it is possible to prevent the contrast performance from deteriorating without unnecessarily raising the minimum luminance level.

It is preferable to configure the image display device of the present invention so that: a luminance level of the image display section which luminance level corresponds to the upper limit is equal to a maximum luminance level which can be displayed by the image display section.

When a display luminance observed in response to a maximum luminance level becomes low, a display maximum luminance becomes low. On the other hand, according to the foregoing configuration, a luminance level of the image display section which luminance level corresponds to the upper limit is made equal to a maximum luminance level which can be displayed by the image display section, so that it is possible to prevent the display maximum luminance from dropping.

It is preferable to configure the image display device of the present invention so that: a gamma property of the image display section is determined so that a display luminance property shows an appropriate gamma property while the image signal levels are within the range from the lower limit to the upper limit.

It is preferable to configure the image display device of the present invention so as to further comprise a detecting section for calculating a motion degree of a video, wherein:

in case where the motion degree is larger than a second threshold value and smaller than a first threshold value, the first image processing section carries out the smoothing process and the second image processing section carries out the emphasizing process so that, as the motion degree is smaller, the image signal levels of the respective pixels are respectively more approximate to image signal levels of the converted input image signals.

It is preferable to configure the image display method of the present invention so that: a motion degree of a video is calculated, and in case where the motion degree is larger than a second threshold value and smaller than a first threshold value, the smoothing process and the emphasizing process are carried out so that, as the motion degree is smaller, the image signal levels of the respective pixels are respectively more approximate to image signal levels of the converted input image signals.

In case where the motion degree is small, for example, in case of displaying an image which slowly moves or an image which is slightly still, inexact luminance display causes significant deterioration of quality of the image. While, in case of displaying an image which quickly moves, a slight luminance display error is not recognized.

According to the foregoing configurations, the image display device comprises a detecting section for calculating a motion degree of a video, wherein: in case where the motion degree is larger than a second threshold value and smaller than a first threshold value, the first image processing section carries out the smoothing process and the second image processing section carries out the emphasizing process so that, as the motion degree is smaller, the image signal levels of the respective pixels are respectively more approximate to image signal levels of the converted input image signals. That is, in case where the motion degree is larger than a second threshold value and smaller than a first threshold value (for example, in case of displaying an image which slowly moves or an image which is slightly still), the process is carried out so that, as the motion degree is smaller, the image signal levels of the respective pixels are respectively more approximate to image signal levels of the converted input image signals. Thus, it is possible to realize more exact luminance display.

It is preferable to configure the image display device of the present invention so that: in case where the motion degree is smaller than the second threshold value, the image display device displays the image in accordance with the converted input image signals.

It is preferable to configure the image display method of the present invention so that: in case where the motion degree is smaller than the second threshold value, the image display device displays the image in accordance with the converted input image signals.

In case where the motion degree is extremely small, for example, in case of displaying an image which is almost still or a still image, less exact luminance display causes significant deterioration of quality of the image. While, in case of displaying an image which quickly moves, a slight luminance display error is not recognized.

According to the foregoing configurations, there is provided the detecting section for calculating a motion degree of a video, and in case where the motion degree is smaller than the second threshold value, the converted input image signals are outputted without any modification. That is, in case where the motion degree is smaller than the second threshold value (for example, in case of displaying an image which is almost still or a still image), the converted input image signals are outputted without any modification. Thus, it is possible to realize further more exact luminance display.

It is preferable to configure the image display device of the present invention so that: for pixels included in a reference range having a target pixel, the detecting section determines, as the motion degree of these pixels, a total value of the number of pixels in which a difference between an image signal level of a converted input image signal in a previous frame and an image signal level of a converted input image signal in a current frame for that pixel is not less than a predetermined value.

It is preferable to configure the image display method of the present invention so that: for pixels included in a reference range having a target pixel, the motion degree of these pixels is a total value of the number of pixels in which a difference between an image signal level of a converted input image signal in a previous frame and an image signal level of a converted input image signal in a current frame for that pixel is not less than a predetermined value.

It is preferable to configure the image display device of the present invention so that: for pixels included in a reference range having a target pixel, the detecting section determines, as the motion degree of these pixels, a value obtained by accumulating differences between image signal levels of the converted input image signals in a previous frame and image signal levels of the converted input image signals in a current frame, in these pixels while more greatly weighting an image signal level of a pixel positioned closer to this target pixel.

It is preferable to configure the image display method of the present invention so that: for pixels included in a reference range having a target pixel, the motion degree of these pixels is a value obtained by accumulating differences between image signal levels of the converted input image signals in a previous frame and image signal levels of the converted input image signals in a current frame, in these pixels while more greatly weighting an image signal level of a pixel positioned closer to this target pixel.

It is preferable to configure the image display device of the present invention so that: for pixels included in a reference range having a target pixel, the detecting section determines, as the motion degree of these pixels, an absolute value of a motion vector calculated for this target pixel.

It is preferable to configure the image display method of the present invention so that: for pixels included in a reference range having a target pixel, the motion degree of these pixels is an absolute value of a motion vector calculated for this target pixel.

This realizes simplicity and low cost.

It is preferable to configure the image display device of the present invention so that: for pixels included in a reference range having a target pixel, the detecting section determines, as the motion degree of these pixels, a value obtained by accumulating absolute values of motion vectors each of which is calculated in each of these pixels, while more greatly weighting an image signal level of a pixel positioned closer to this target pixel.

It is preferable to configure the image display method of the present invention so that: for pixels included in a reference range having a target pixel, the motion degree of these pixels is a value obtained by accumulating absolute values of motion vectors each of which is calculated in each of these pixels, while more greatly weighting an image signal level of a pixel positioned closer to this target pixel.

It is preferable to configure the image display device of the present invention so that: a distance between the target pixel and a closer end of the screen in a vertical direction and/or a horizontal direction is represented by d, and $0<D1 \leq D2$, and in case where $D2 \leq d$, the first image processing section carries out the smoothing process and the second image processing section carries out the emphasizing process, and in case where $D1 \leq d<D2$, the first image processing section and the second image processing section carry out image processing so that, as d is smaller, a difference between an output image signal and each of the converted input image signals is smaller, and in case where $d<D1$, the first image processing section and the second image processing section output the converted input image signals without any correction.

It is preferable to configure the image display method of the present invention so that: a distance between the target pixel and a closer end of the screen in a vertical direction and/or a horizontal direction is represented by d, and $0<D1 \leq D2$, and in case where $D2 \leq d$, the emphasizing process is carried out which carrying out the smoothing process, and in case where $D1 \leq d < D2$, image processing is carried out so that a difference between an output image signal and each of the converted input image signals is smaller as d is smaller, and in case where $d < D1$, the converted input image signals are outputted without any correction.

According to the foregoing configurations, in case of referring to pixel signal levels of the reference range including the target pixel in carrying out the smoothing process and the emphasizing process, the reference range may partially deviate from the screen. However, according to the foregoing configurations, $0 < D1 \leq D2$, and in case where $D2 \leq d$, the first image processing section carries out the smoothing process and the second image processing section carries out the emphasizing process, and in case where $D1 \leq d < D2$, the first image processing section and the second image processing section carry out image processing so that, as d is smaller, a difference between an output image signal and each of the converted input image signals is smaller, and in case where $d < D1$, the first image processing section and the second image processing section output the converted input image signals without any correction.

Thus, as long as the reference range does not deviate from the screen, the smoothing process and the emphasizing process are carried out. As the target pixel becomes closer to the end of the screen, the output image signals are gradually becoming approximate to the converted input image signals. Thus, while suppressing the strange feeling at the end of the screen, it is possible to carry out the smoothing process and the emphasizing process with respect to other portions.

It is preferable to configure the image display device of the present invention so that: in case where D1 and D2 in the vertical direction are respectively defined as Dy1 and Dy2 and in case where D1 and D2 in the horizontal direction are respectively defined as Dx1 and Dx2, $Dy1 < Dx1$ and $Dy2 < Dx2$.

It is preferable to configure the image display device of the present invention so that: Dy1 is not more than 5% with respect to a vertical image length and Dx1 is not more than 5% with respect to a horizontal image length.

It is preferable to configure the image display device of the present invention so that: Dy2 is not more than 10% with respect to a vertical image length and Dx2 is not more than 10% with respect to a horizontal image length.

Industrial Applicability

The image display device and the image display method of the present invention are applicable to a liquid crystal or organic EL or an E-ink and the like, moving image display appliances each using a display device for carrying out hold mode display, a television, a personal computer monitor, a DVD player provided with a monitor, a game machine, a car navigation system, a mobile video player, a mobile phone, and the like.

The invention claimed is:

1. An image display device for displaying an image in accordance with image signals of respective pixels in each frame period wherein a frame period corresponds to image signals for a single screen, said image display device comprising:
   a divider for dividing a single frame period into a plurality of periods including at least one sub frame A period and at least one sub frame B period;
   a first image processor for carrying out a smoothing process with respect to the image signals of the respective pixels in the sub frame A period, the smoothing process to reduce a difference between an image signal level of a target pixel and an image signal level of a peripheral pixel;
   a second image processor for carrying out an emphasizing process with respect to the image signals of the respective pixels in the sub frame B period, the emphasizing process to increase the difference between the image signal level of the target pixel and the image signal level of the peripheral pixel;
   an image display for displaying an image in accordance with (i) the image signals which have been subjected to the smoothing process by the first image processing section and which correspond to the respective pixels and (ii) the image signals which have been subjected to the emphasizing process by the second image processing section and which correspond to the respective pixels; and
   a detector for calculating a motion degree of a video, wherein:
   in case where the motion degree is larger than a second threshold value and smaller than a first threshold value,
   the first image processor carries out the smoothing process and the second image processor carries out the emphasizing process so that, as the motion degree is smaller, the image signal levels of the respective pixels are respectively more approximate to image signal levels of the image signals.

2. The image display device as set forth in claim 1, wherein:
the first image processor accumulates the image signal levels for the pixels included in a reference range while more greatly weighting an image signal level of a pixel positioned closer to the target pixel, and averages the accumulated values for the pixels included in the reference range.

3. The image display device as set forth in claim 1, wherein:
in case where the motion degree is smaller than the second threshold value, the image display device displays the image in accordance with the input image signals.

4. The image display device as set forth in claim 1, wherein:
for pixels included in a reference range having the target pixel, the detector determines, as the motion degree of the pixels in the reference range, a total value of the number of pixels in which a difference between an image signal level of an input image signal in a previous frame and an image signal level of an input image signal in a current frame for that pixel is not less than a value.

5. The image display device as set forth in claim 1, wherein:
for pixels included in a reference range having the target pixel, the detector determines, as the motion degree of the pixels in the reference range, a value obtained by accumulating differences between image signal levels of the input image signals in a previous frame and image signal levels of the input image signals in a current frame, in the pixels in the reference range while more greatly weighting an image signal level of a pixel positioned closer to the target pixel.

6. The image display device as set forth in claim 1, wherein:
for pixels included in a reference range having the target pixel, the detector determines, as the motion degree of the pixels in the reference range, an absolute value of a motion vector calculated for the target pixel.

7. The image display device as set forth in claim 1, wherein:
for pixels included in a reference range having the target pixel, the detector determines, as the motion degree of the pixels in the reference range, a value obtained by accumulating absolute values of motion vectors each of which is calculated in each of the pixels in the reference range, while more greatly weighting an image signal level of a pixel positioned closer to the target pixel.

8. The image display device as set forth in claim 1, wherein:
a distance between the target pixel and a closer end of the screen in a vertical direction and/or a horizontal direction is represented by d, and 0<D1≦D2, D1 is a shortest distance between of a reference range being within the screen and D2 is a distance greater than D1, and in case where D2≦d, the first image processor carries out the smoothing process and the second image processor carries out the emphasizing process, and in case where D1≦d<D2, the first image processor and the second image processor carry out image processing so that, as d is smaller, a difference between an output image signal and each of the input image signals is smaller, and in case where d<D1, the first image processor and the second image processor output the input image signals without any correction.

9. The image display device as set forth in claim 8, wherein in case where D1 and D2 in the vertical direction are respectively defined as Dy1 and Dy2 and in case where D1 and D2 in the horizontal direction are respectively defined as Dx1 and Dx2, Dy1<Dx1 and Dy2<Dx2.

10. The image display device as set forth in claim 8, wherein
Dy1 is not more than 5% with respect to a vertical image length and Dx1 is not more than 5% with respect to a horizontal image length.

11. The image display device as set forth in claim 8, wherein
Dy2 is not more than 10% with respect to a vertical image length and Dx2 is not more than 10% with respect to a horizontal image length.

12. An image display method in which an image is displayed in accordance with image signals of respective pixels in each frame period wherein a frame period corresponds to image signals for a single screen, said image display method comprising:

dividing a single frame period into a plurality of periods including at least one sub frame A period and at least one sub frame B period;

carrying out a smoothing process with respect to the image signals of the respective pixels in the sub frame A period and for carrying out an emphasizing process with respect to the image signals of the respective pixels in the sub frame B period; and calculating a motion degree of a video, wherein in case where the motion degree is larger than a second threshold value and smaller than a first threshold value, the smoothing process and the emphasizing process are carried out so that, as the motion degree is smaller, the image signal levels of the respective pixels are respectively more approximate to image signal levels of the image signals, the smoothing process to reduce a difference between an image signal level of a target pixel and an image signal level of a peripheral pixel, and the emphasizing process to increase the difference between the image signal level of the target pixel and the image signal level of the peripheral pixel.

13. The image display method as set forth in claim 12, wherein:
in the smoothing process, the image signal levels for the pixels included in a reference range are accumulated while more greatly weighting an image signal level of a pixel positioned closer to the target pixel, and the accumulated values for the pixels included in the reference range.

14. The image display method as set forth in claim 12, wherein:
in case where the motion degree is smaller than the second threshold value, the image display device displays the image in accordance with the input image signals.

15. The image display method as set forth in claim 12, wherein:
for pixels included in a reference range having the target pixel, the motion degree of the pixels in the reference range is a total value of the number of pixels in which a difference between an image signal level of an input image signal in a previous frame and an image signal level of an input image signal in a current frame for that pixel is not less than a predetermined value.

16. The image display method as set forth in claim 12, wherein:
for pixels included in a reference range having the target pixel, the motion degree of the pixels in the reference range is a value obtained by accumulating differences between image signal levels of the input image signals in a previous frame and image signal levels of the input image signals in a current frame, in the pixels in the reference range while more greatly weighting an image signal level of a pixel positioned closer to the target pixel.

17. The image display method as set forth in claim 12, wherein:
for pixels included in a reference range having the target pixel, the motion degree of the pixels in the reference range is an absolute value of a motion vector calculated for the target pixel.

18. The image display method as set forth in claim 12, wherein:
for pixels included in a reference range having the target pixel, the motion degree of the pixels in the reference range is a value obtained by accumulating absolute values of motion vectors each of which is calculated in each of the pixels in the reference range, while more greatly weighting an image signal level of a pixel positioned closer to the target pixel.

19. The image display method as set forth in claim 12, wherein:
a distance between the target pixel and a closer end of the screen in a vertical direction and/or a horizontal direction is represented by d, and 0<D1≦D2, D1 is a shortest distance between of a reference range being within the screen and D2 is a distance greater than D1, and in case where D2≦d, the emphasizing process is carried out which carrying out the smoothing process, and in case where D1≦d<D2, image processing is carried out so that a difference between an output image signal and each of the input image signals is smaller as d is smaller, and in case where d<D1, the input image signals are outputted without any correction.

* * * * *